Figure 1:
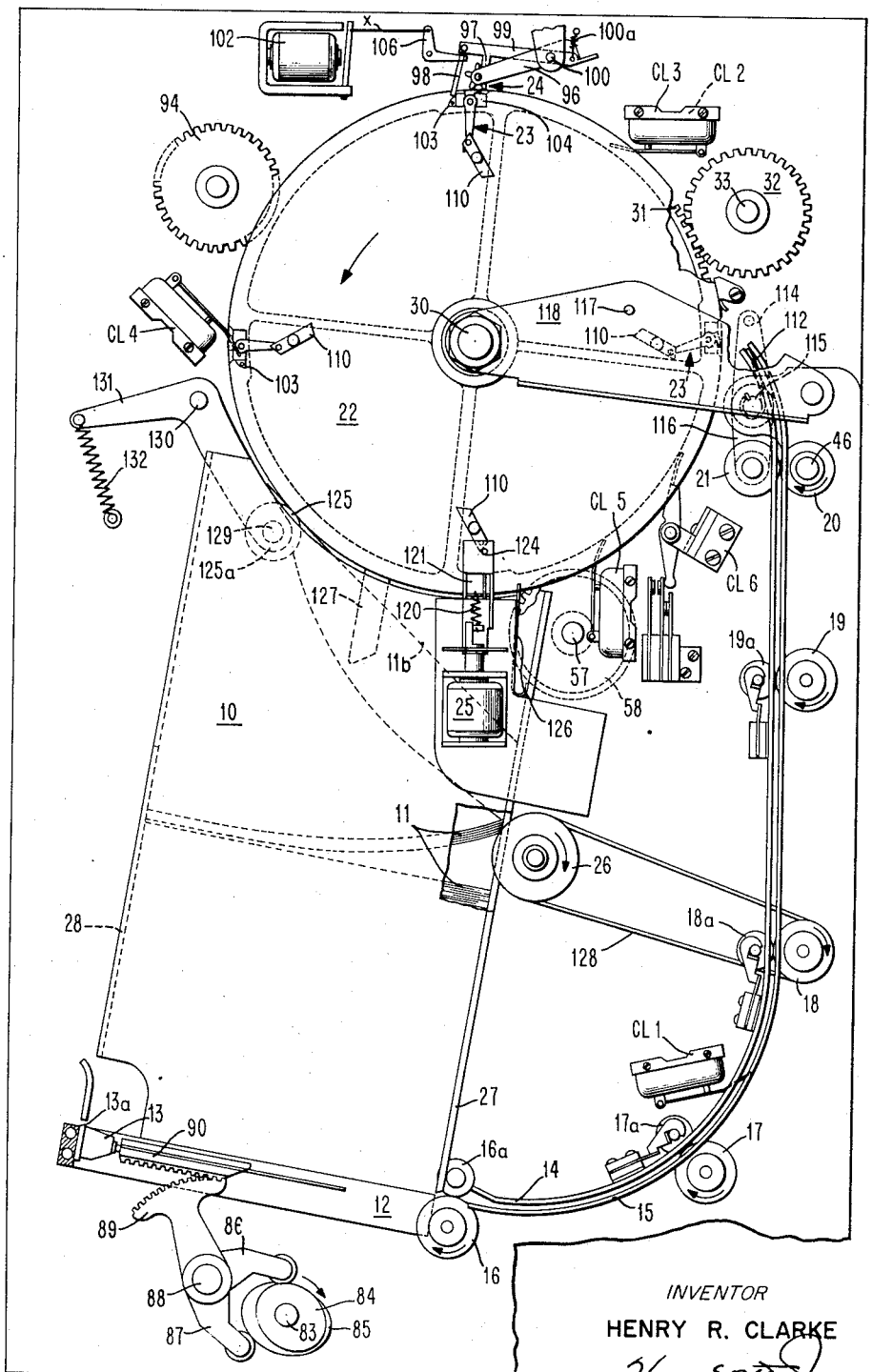

INVENTOR
HENRY R. CLARKE
BY
ATTORNEY

May 7, 1963 H. R. CLARKE 3,088,666
PROGRAMMING APPARATUS
Filed Dec. 28, 1960 11 Sheets-Sheet 4

May 7, 1963

H. R. CLARKE 3,088,666

PROGRAMMING APPARATUS

Filed Dec. 28, 1960

11 Sheets-Sheet 6

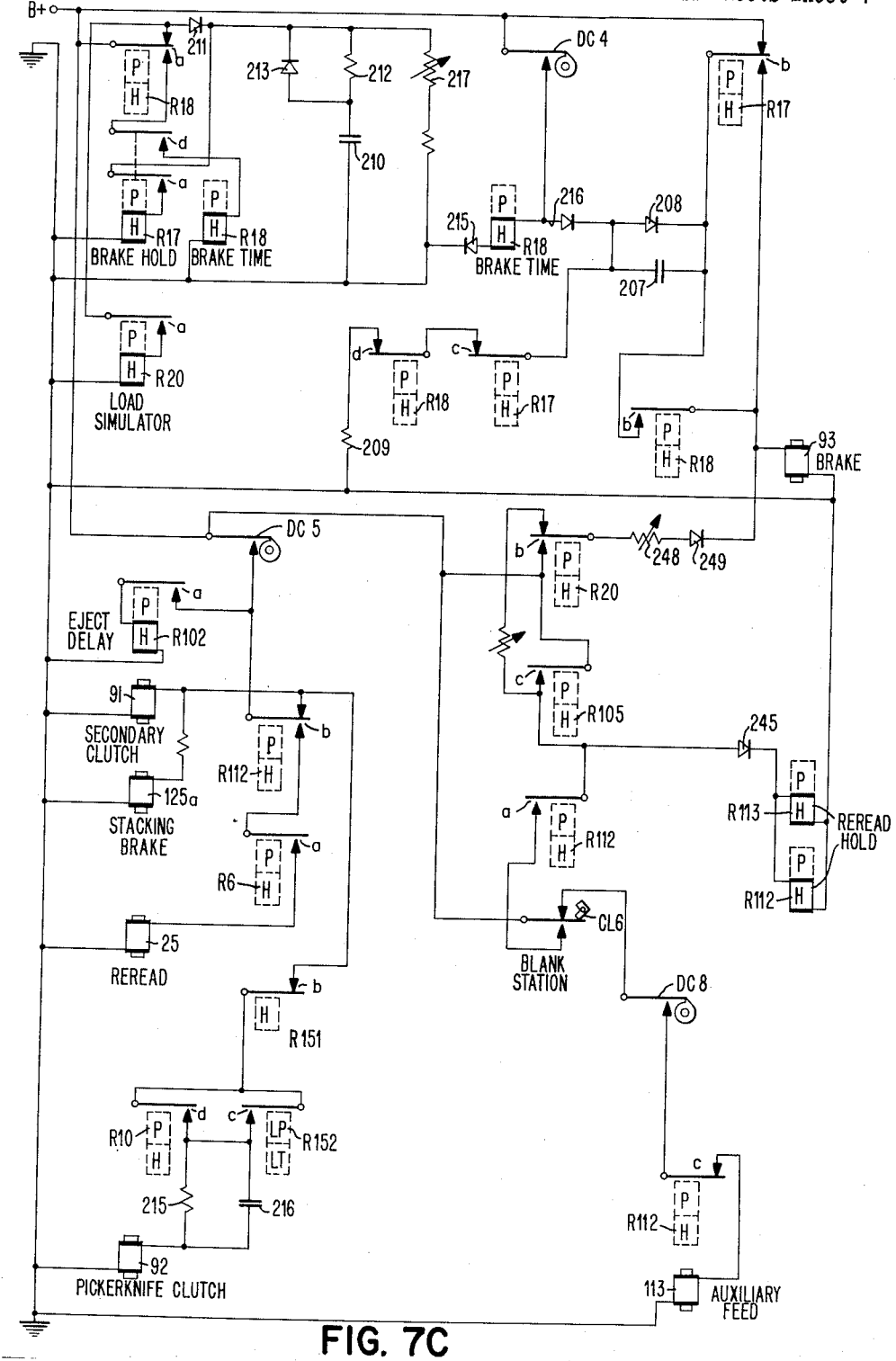

United States Patent Office 3,088,666
Patented May 7, 1963

3,088,666
PROGRAMMING APPARATUS
Henry R. Clarke, Vestal, N.Y., assignor to International Business Machines Corporation, New York, N.Y., a corporation of New York
Filed Dec. 23, 1960, Ser. No. 79,049
11 Claims. (Cl. 235—61.11)

This invention relates to programming apparatus, and more particularly to such apparatus employing automatically recirculated record cards coded to initiate and supervise a series of sub-programs forming part of, for example, a sequential automatic inspection and/or maintenance test master program wherein failure of a unit or assemblage to pass a certain test point in one sub-program results in or requires adjustments that may require a review of previously passed test points in that sub-program or a previous one and thus require a reread feature.

Apparatus has heretofore been provided to permit repeated rereading of a single record card. Apparatus has also been provided to divert a record card from a normal feed path, feed other cards ahead of it, and then redirect such card back into said path, with the result that such card will be stacked in a sequence different from its original sequence.

Previously proposed apparatus is not suitable, however, for a fully automatic programming system wherein a very large number (such as 1000) record cards are sequentially arranged in successive groups of from, say, one to three cards with those cards of each group being coded to provide a particular sub-program, and wherein the cards are arranged in a deck and adapted to be recirculated without human intervention. In such a system the original order of the cards should be maintained to prevent the cards of each group from becoming separated or rearranged relative to those of the same or other groups, for any such rearrangement would require an almost complete recirculation of the large deck to perform the steps of a particular sub-program in the proper sequence. Also, it is desirable to be able to reread any number or all of the cards of a particular sub-program any desired number of times without requiring recirculation of the entire deck of cards covering the master program.

The principal object of this invention is therefore to provide a compact, relatively inexpensive programming apparatus of the above general type wherein one or more cards of a group of as many as 1000 cards can be rerun past, and reread by, a read means at a single read station without a change in their original sequence and without recirculation through a hopper-stacker and without requiring human intervention.

Another object is to provide a programming apparatus embodying a single read station and wherein the decision to rerun a card past said station for rereading (rather than return it to the hopper) may be delayed until after a subsequent card is read.

Another object is to provide an arrangement for clamping the cards to and unclamping them from a revolving drum capable of recirculating cards past the read station.

The foregoing and other objects, features and advantages of the invention will be apparent from the following more particular description of a preferred embodiment of the invention, as illustrated in the accompanying drawings.

Figure 2:
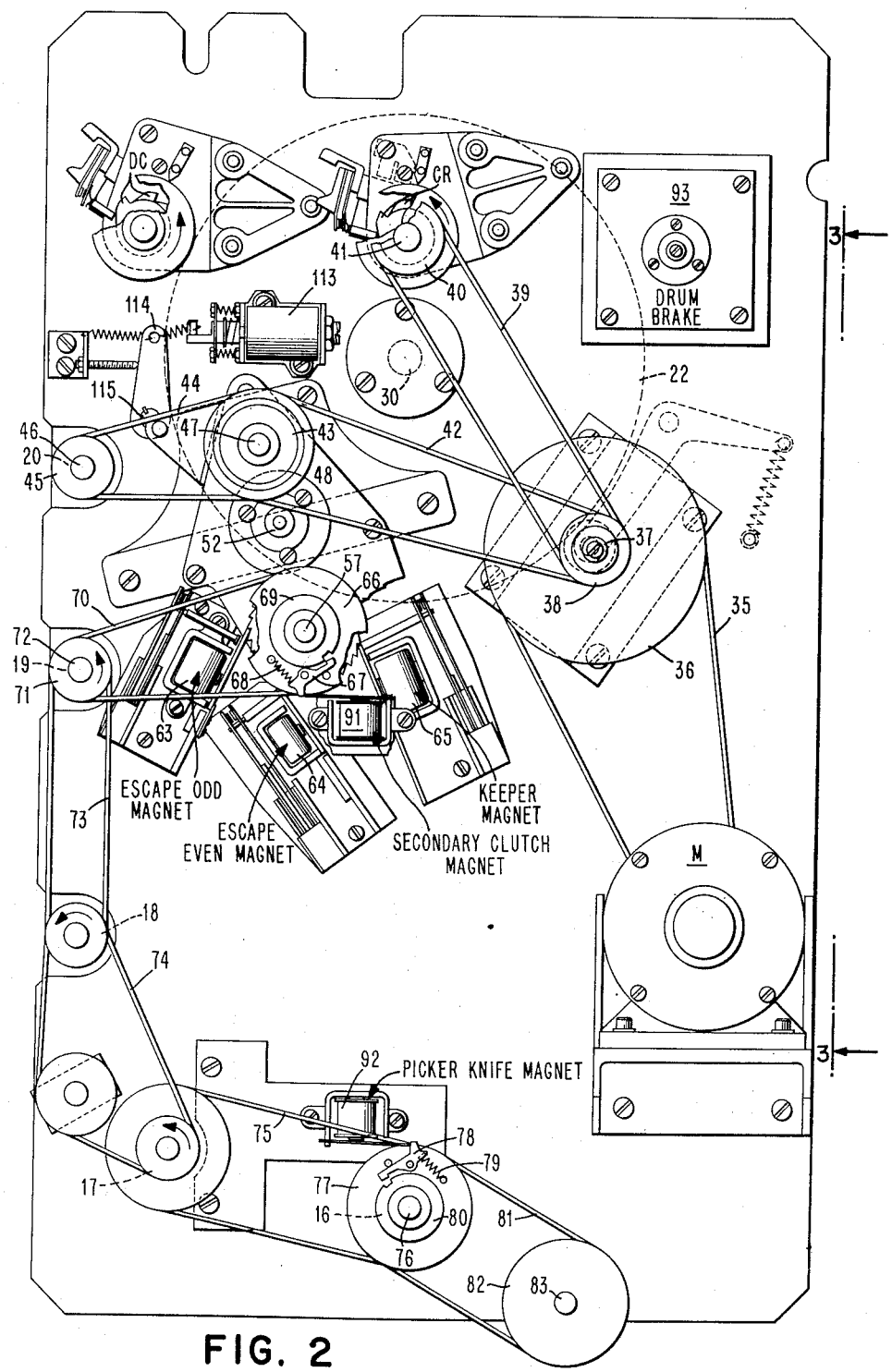
Figure 3:
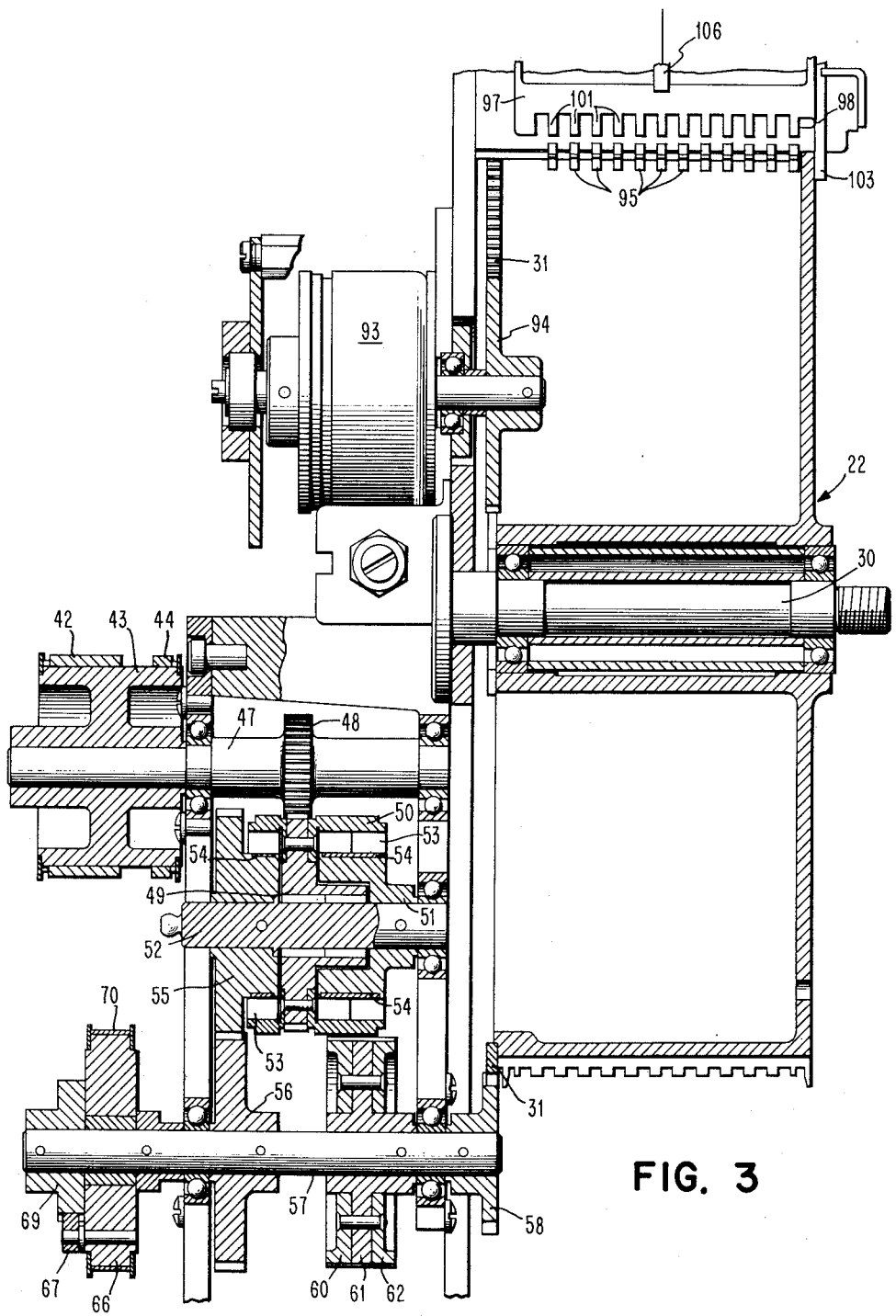
Figure 4:
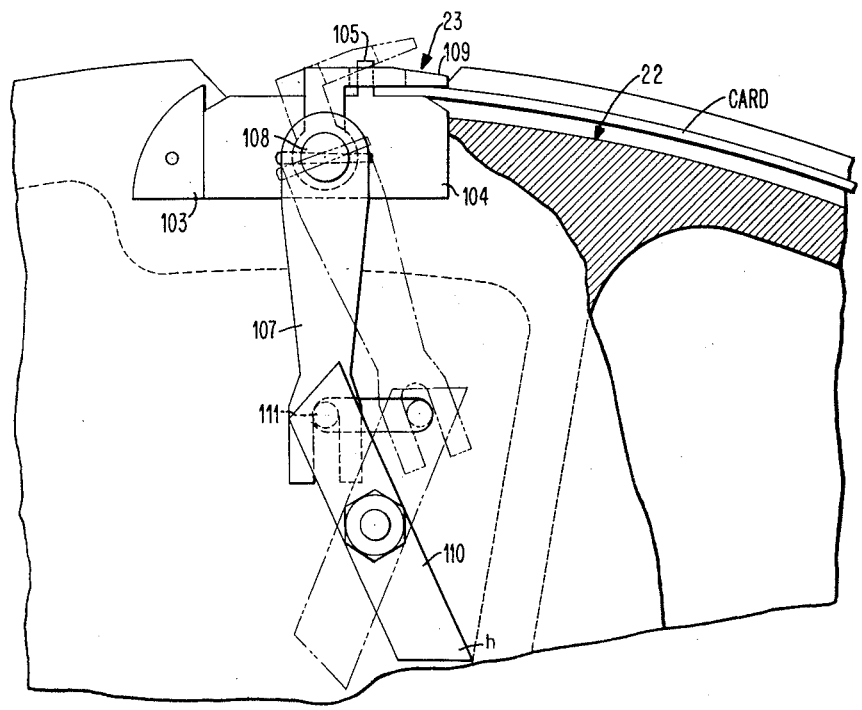
Figure 5:
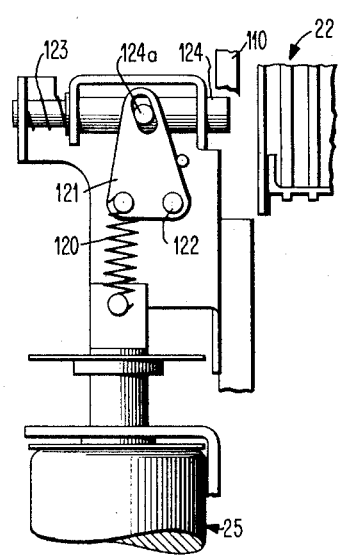
Figure 6A:
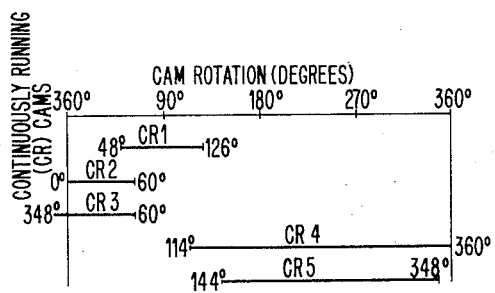
Figure 6B:
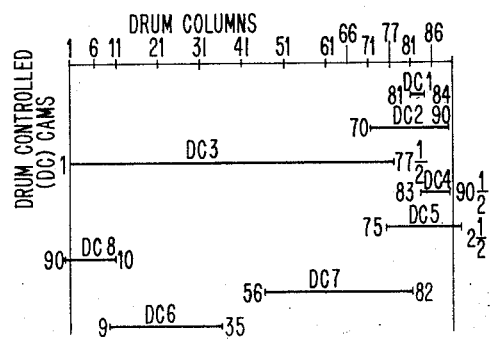

In the drawings:
FIG. 1 is an elevation view of one side of a programming apparatus embodying the invention;
FIG. 2 is an elevation view of the opposite side of the apparatus;
FIG. 3 is a fragmentary end view, to enlarged scale, taken in the direction of arrows 3—3 on FIG. 2;
FIG. 4 is a detail view, to enlarged scale, of a card-clamping means shown in FIG. 1;
FIG. 5 is an enlarged front view of a reread solenoid and associated structure as viewed from the right hand side of FIG. 1;
FIGS. 6A and 6B are timing diagrams for five motor-driven continuously running circuit breaker cams and for eight drum-controlled circuit breaker cams, respectively;
FIGS. 7A through 7F are diagrams of the electrical circuits of the apparatus; and
FIGS. 8A through 8F are diagrammatic views showing the positions of various cards during different phases of a reread cycle of operation of the apparatus.

Description

As illustrated in FIG. 1, the programming apparatus embodying the invention comprises a hopper-stacker 10 containing a deck of record cards 11 supported on a bed plate 12; card feed means in the form of a reciprocating picker knife 13 having a knife edge 13a which projects above the bed plate and advances successive bottommost cards rightward serial (i.e., lengthwise) into a chute defined between guides 14, 15; feed rolls 16, 17 18, 19 mating with respective idler rolls 16a, 17a, 18a, 19a for advancing the cards at one speed between an accelerating roll 20 and a retractable idler roll 21 near the exit end of the chute; a rotating card drum 22 onto the periphery of which cards are feedable serially at a higher speed by roll 20 when the idler roll 21 is in a card-pinching position; four sets of clamping means 23 (see FIG. 4 for detail) spaced ninety degrees apart, each for clamping a respective card to the drum; read means at a read station 24 for sensing code indicia, such as punched holes, on or in the cards; means including a reread solenoid 25 at a stacking station for controlling whether a particular clamp-means 23 will be unclamped to permit the card to be released from the drum into the hopper-stacker 10 or retained on the drum for rereading at the read station 24; and a pair of transversely aligned dribble rolls 26 (only one of which is shown) mounted on a common drive shaft and extending through slots in the forward wall 27 of the hopper-stacker to align the released cards against said wall as they settle on the card deck below the rolls 26.

As illustrated, the cards 11 are conventional 80-column record cards, and the drum 22 has a circumference equivalent to 360 columns, or one column per degree of drum rotation to provide a ten-column space or gap between columns "80" and "1" of successive cards, which are fed serially onto the drum. During subsequent description, certain structure or events will be stated as corresponding to or occurring at a certain column position of the drum 22; if a certain event is described as occurring at column "83" time, for example, it will be understood that this does not refer to column "83" of the card (which has only 80 columns) but instead refers to a time when column "80" of a card has advanced (or would have advanced if on drum 22) three card columns past read station 24.

The drum 22 is rotatably mounted on a stud 30 and carries a ring gear 31 that, through a pinion 32, drives a shaft 33 on which are mounted eight drum-controlled circuit breaker cams DC1 to DC8 (FIG. 2) which rotate only when the drum is rotated. Each of these DC cams rotates one revolution during a quarter revolution of drum 22 and hence during one complete card cycle.

Referring now to FIG. 2, a motor M through a belt 35 drives a speed-reducing idler pulley 36 secured to a shaft 37 on which is mounted a smaller pulley 38 that, in turn, through belt 39 and a pulley 40 drives a shaft 41. Five continuously running circuit breaker cams CR1 to CR5 are mounted on shaft 41 so as to be rotated whenever motor M is running. However, the pulses generated by these CR cams are effective only during reading of a card. Each CR cam makes a full revolution in a predetermined time (such as 60 milliseconds).

Shaft 37, through pulley 38 and a belt 42, also drives a pulley 43 that, in turn, through a belt 44 and a pulley 45 drives a drive shaft 46 for the accelerating roll 20. Pulley 43 drives its support shaft 47 and thereby a pinion 48 mounted thereon. As best shown in FIG. 3, pinion 48 through a gear 49 rotates a slip clutch outer hub or housing 50 that drives an inner hub 51 (pinned to a shaft 52) through C-shaped shoes 53 pressed outwardly into contact with the housing by C-shaped springs 54 mounted over the inner hub. A gear 55, which is pinned to shaft 52, meshes with a gear 56 to drive a shaft 57 to which is pinned a pinion 58 that meshes with ring gear 31 of drum 22.

Thus, drum 22 tends to be driven impositively through slip clutch 50, 53, 51 whenever the motor M is running. However, the drum 22 can be constrained to rotate in column-by-column increments by an escapement mechanism including odd-column escape, even-column escape, and keeper ratchets 60, 61, 62, respectively, mounted on shaft 57 and laterally pinned to each other and collectively pinned to said shaft. Magnets 63, 64, 65 (FIG. 2) have armatures $x$ which are spring-biased toward engagement with the teeth of ratchets 60, 61, 62, respectively, and which, when so engaged, cause respective contacts 63a, 64a, 65a mechanically to close to denote such engagement; however, when respective coils of these magnets are selectively energized, the attracted armature $x$ will act through a plunger $y$ to open the corresponding contacts.

The escape odd ratchet 60 has forty teeth which are cut the same way as, but staggered relative to, the forty teeth on the escape even ratchet 61; but keeper ratchet 62 has eighty teeth cut the opposite way to the teeth of ratchets 60, 61 (see FIG. 2). Each of the forty teeth on ratchets 60, 61 correspond to two-card column increments of rotation of drum 22, but since the odd-column teeth on ratchet 60 and even-column teeth on ratchet 61 are staggered, the drum will advance only a single column upon concurrent deenergization of one of the magnets 63, 64 and energization of the other. It is to be noted that each ratchet 60, 61, 62 has a non-toothed smooth portion covering an arc corresponding substantially to the ten-column gap between columns of succesive record cards, and that each ratchet revolves once during each one-quarter revolution of drum 22. The ten-column span of the smooth portion of escape odd ratchet 60 extends from columns "81" to "1" of the drum; that of escape even ratchet 61, from columns "82" to "2"; and that of keeper ratchet 62, from columns "80" to "1."

Thus if while the escape odd magnet 63 is deenergized, the escape even magnet 64 is energized, the escape even armature $x$ will be retracted and contact 64a will be opened. Drum 22 will be driven by slip clutch 50, 53, 51 a one-column increment until the drum and hence the card is advanced from an even column to the subsequent odd column position (for example, from column "2" to column "3") at which armature $x$ of deenergized magnet 63 will engage the column "3" tooth of ratchet 60. When magnet 64 is subsequently deenergized, its armature $x$ will rest midway between the column "2" and column "4" teeth on ratchet 61, and its contact 64a will reclose. If while escape even magnet 64 is deenergized the escape odd magnet 63 is subsequently energized, the drum 22 will advance another column increment until the armature $x$ of magnet 64 engages the column "4" tooth on ratchet 61. When the magnet 63 is later deenergized, its armature $x$ will be disposed between the column "3" and column "5" teeth on ratchet 60, and the contact 63a will reclose. Thus, the drum 22 will escape column-by-column as magnets 63 and 64 are alternatively energized.

The keeper magnet 65 is deenergized during column-by-column escapement of the drum 22 so that its arma-ture $x$ will effectively open the associated contact 65a while the armature rides over a tooth on ratchet 62, and close such contact when the armature fully engages a tooth. Thus the successive opening and closing of the keeper contact 65a verifies that the drum 22 has moved one column. Since the keeper armature 65x will fully engage a tooth on keeper ratchet 62 only when either of the escape ratchets 60 or 61 is latched by its armature, the keeper contact 65a is employed in an electrical circuit (hereinafter described) to prevent information from being read into buffer relays R114 to R149 except when one of these ratchets 60 or 61 is latched. However, during an eject cycle (hereinafter described), the magnets 63, 64, 65 are concurrently energized to permit the drum 22 to rotate freely.

As shown in FIG. 2 and FIG. 3, a pulley 66 rotatably mounted on shaft 57 carries a laterally projecting pin on which is fulcrumed a rockable clutch dog 67 of a secondary clutch 67, 69. Dog 67 is biased by a pusher spring 68 into contact with a single-toothed ratchet 69 pinned to shaft 57. When clutch dog 67 is engaged, shaft 57 drives pulley 66 which, in turn, through a belt 70, a pulley 71 and a shaft 72, drives feed roll 19. The other feed rolls 18, 17, 16 are effectively driven from shaft 72 by a train of successive pulley-driven belts 73, 74, 75, as clearly shown in FIG. 2. Belt 75 effectively drives a shaft 76 on which is rotatably mounted a pulley 77 that carries a laterally projecting fulcrum pin for a rockable clutch dog 78 that is biased by a pusher spring 79 into contact with a single-toothed ratchet 80 pinned to shaft 76. Dog 78 and ratchet 80 constitute a picker knife clutch 78, 80. When clutch dog 78 is engaged, shaft 76 through pulley 77 drives a belt 81 that through a pulley 82 and shaft 83 drives a pair of complementary picker knife cams 84, 85 (FIG. 1). These cams 84, 85 through respective followers 86, 87 oscillate a shaft 88 to rock a gear sector 89 to reciprocate a rack 90 and thereby the picker knife 13 secured thereto.

The dog 67 of secondary clutch 67, 69 is disengaged during a reread cycle (hereinafter to be described) to stop driving pulley 66 and hence the rolls 19, 18, 17, 16 and picker knife 13 to prevent cards 11 from being fed into and along chute 14, 15. To do this, a normally energized secondary clutch magnet 91 is deenergized so that the end of its armature $x$ will extend into the path of, and be struck by, a projection on the dog 67 as the latter is being rotated by pulley 57, to cause the dog to be rocked away from ratchet 69 and into contact with a stop pin, as shown in FIG. 2. On the other hand, to permit cards 11 already in chute 14, 15 to be advanced to the drum 22 but prevent feeding of additional cards by the picker knife 13, the latter may be stopped by disengaging dog 78 of picker knife clutch 78, 80 while dog 67 of the secondary clutch 67, 69 is engaged. To do this, a normally energized magnet 92 is deenergized so that the end of its armature $x$ will be struck by a projection on dog 78 and rock the latter away from ratchet 80 into contact with a stop pin (see FIG. 2).

A magnetic brake 93 is mounted on the same shaft as a brake pinion 94 that meshes with ring gear 31 of drum 22. Pinion 94 is allowed to rotate freely until column "83" position of the drum 22, which as above explained means when card column "80" has (or would have, if on the drum 22) passed three card columns and hence three degrees beyond the read station 24. Brake 93 will thereupon be energized by a brake circuit later to be described to effect deceleration of the drum 22 until it is finally stopped by said brake and the armature of odd column escape magnet 63 popping in to engage the column "1" tooth of the ratchet 60. Also, during a reread operation, brake 93 is kept slightly energized to simulate the torque of the disengaged drive mechanism for rolls 19 to 16 and picker knife 13.

At the read station 24 there is a bank of twelve star wheels 95 (see FIGS. 1, 3) pivotally connected to corresponding suitably supported rockable levers 96. There is one star wheel 95 for each of the twelve rows of a standard record card, so that punched holes in each row can be sensed column-by-column. An anti-walk comb 97 and a feeler 98 depend from a lever 99 fulcrumed at 100. A spring 100a acts on the lever 99 to bias the comb 97 and feeler 98 toward the drum 22. The comb 97 has twelve teeth 101 (FIG. 3) and is adjusted so that if a star wheel 95 attempts to walk over a punched hole, the corresponding tooth 101 will catch one of the points of the star wheel and assure that it enters the hole and sense it.

The comb 97 is adapted to be elevated either by a magnet 102 or by one of four anti-walk cams 103. The cams 103 are secured to the side of the drum 22 ninety degrees apart and each cam is just ahead of a corresponding one of four elements 104. Each element 104 is inset into a respective recess in the drum periphery and provides a radially projecting registration member 105 (FIG. 4).

Magnet 102 is energized by an eject command through a circuit closed by cam DC3 between the column "1" and "77½" positions of the drum 22 to cause the magnet's armature $x$ (FIG. 1) through suitable linkage, including a bell crank 106 and lever 99, to rock the comb 97 away from the star wheels 95 during an eject cycle. On the other hand, just before one of the clamping means 23 moves under the star wheels 95, the particular cam 103 just ahead of that clamping means will always strike feeler 98 and thus pivot lever 99 to rock the comb 97 up out of the way temporarily while the clamping means passes by the star wheels; and as soon as it has passed, spring 101a will lower the comb promptly so that it will bear on the star wheels just before the star wheels register with column "1" of a card at the read station 24. The cams 103 and feeler 98 are used to assure that comb 97 will be lowered at precisely the right time and without regard to variations in the drop-out time of a particular magnet 102.

As best shown in FIG. 4, each clamping means 23 comprises a clamping member 107 which is rockably supported on a laterally projecting pin 108 carried by a corresponding one of the inset elements 104 and terminates at one end in a clamping hood or jaw 109. A spring-loaded toggle 110, which is rockably supported on a stud secured to the side of drum 22, carries a pin 111 that projects laterally into the yoked opposite end of member 107 to rock the latter to clamp the jaw 109 against a card or unclamp it according to which way the toggle is flipped.

Referring now to FIG. 1, after a card 11 is picked off the card deck in the hopper-stacker 10 by the reciprocating picker knife 13, it is fed by the feed rolls 16, 17, 18, 19 (which are controlled by secondary clutch 67, 69) to the top of chute 14, 15 where it is restrained by a clamping spring 112 that clamps the card against guide 15 when idler 21 is retracted to hold the card in a position where its leading edge is about ⅛ inch ahead of the trailing edge of the closest clamping jaw 109 on the drum. The drum 22 continues to rotate until the trailing edge of the clamping jaw 109 passes the stationary leading edge of the card. At the proper time, an auxiliary feed solenoid 113 (FIG. 2) is energized to rock a link 114 and thereby a shaft 115 clockwise to cause the latter to rock a link 116 (FIG. 1) to move idler 21 toward the rotating accelerating roll 20 to pinch a card. Rolls 20, 21 then accelerate the card so it enters the unclamped jaw 109 and registers against the registration member 105. Thereafter, as the drum 22 continues to rotate, toggle 110 will graze a stationary stud 117 carried by a fixed arm 118 and thereby be flipped to clamp jaw 109 against the card. As this card passes onto and around drum 22, other cards will normally be fed into and along chute 14, 15 in similar manner.

From the entry station at the exit end of chute 14, 15, the card is carried in successive ninety-degree arcs to the bank of star wheels 95 at the read station, then to a reread checking station, and then to the stacking station. If reread solenoid 25 is deenergized (see FIGS. 1, 5), a spring 120 will have biased a rockable link 121 clockwise, as viewed in FIG. 5, about a fulcrum pin 122 to enable a spring 123 to project a stacking pin 124 axially into the path of rotation of the toggles 110, said pin and link being connected by a pin-and-slot connection at 124a.

When the drum 22 rotates to a position where the heel $h$ (FIG. 4) of toggle 110 strikes the projected pin 124 and flips the toggle, jaw 109 will snap open and unclamp the leading edge of a card 11. A stacking brake coil 125a is mounted over a shaft 129 to which is pinned a high friction pressure roll 125. Roll 125 is connected by shaft 129 to a bell crank 131 that is rockably supported on a pin 130 and biased by a spring 132 into contact with a card on the drum. This coil 125a is energized at the time jaw 109 snaps open so that it will impose a drag on the shaft 129 and hence on roll 125 and thereby on the trailing portion of the card. As the drum 22 continues to rotate, it will carry the jaw 109 away from the card until the leading edge of the card clears the trailing edge of the jaw; whereupon the leading edge of the card will snap away from the drum as the card tends to straighten itself. Then, the coil 125a is deenergized to permit roll 125 to rotate and cause the drum 22 to drive the card generally tangentially relative to the "bite" of roll 125 with the drum until the leading edge of the card strikes front wall 27 of the hopper stacker 10, as indicated at 11a in FIG. 1. Due to the high coefficient of friction of roll 125, the card will thereafter become bowed as indicated at 11b in FIG. 1 and then the trailing edge of the card will be driven past roll 125 and snap down.

A card pick-off safety spring 126, a pair of restraining springs 127 (only one shown), and the dribble rolls 26 respectively operate in the manner fully disclosed and claimed in my copending application, U.S. Serial Number 78,957, filed December 28, 1960 (now U. S. Patent No. 3,062,531, granted November 6, 1962), to assure stripping of a card from the drum, control the descent of the cards toward the deck, and effect joggling of the cards onto the top of the deck in such manner that they are aligned against the front wall 27 of the hopper.

Each DC drum-controlled circuit breaker cam (DC1 to 8) and each CR continually running circuit breaker cam (CR1 to 5) effects closure of an associated electrical contact during a prescribed period as shown in FIGS. 6A and 6B, respectively.

Referring to FIG. 1, a chute card lever CL1 has a normally open contact which, when closed, signifies that a card 11 is in the chute 14, 15 and that the picker knife 13 has operated. Read station card levers CL2 and CL3 each have a transfer contact which is controlled according to whether or not a card is at the read station 24, CL2 being hidden behind CL3 as viewed in FIG. 1. If there is no card at the read station (which should occur only during a reread operation or initial loading of the drum), CL2 will initiate an eject cycle to bring the next card to the read station. CL3 functions during a drum unloading operation.

A reread check card lever CL4 has a normally open contact which, when closed, signifies a card is at the reread checking station. During a reread operation, the presence of a card at the reread checking station enables the reread solenoid 25 to be energized at DC5 time (the time when cam DC5 closes the contact it controls). When solenoid 25 is energized, it will pull on spring 120 (FIG. 5) to rock link 121 counterclockwise about pin 122 and thus retract pin 124 out of the path of toggle 110 through the pin-in-slot connection 124a, so that the toggle will not be flipped by pin 124 and the card will remain clamped to the drum 22 by jaw 109 rather than being stacked.

A stacking check card lever CL5 located just beyond the stacking station has a normally closed contact which is opened if and when a card passes the stacking station. If while solenoid 25 is deenergized to call for stacking of cards, a card should for any reason fail to stack or cards should become jammed at the stacking station and extend beyond wall 27, the contact of CL5 will open to open circuitry for stopping the drum 22 and picker knife 13 and feed rolls 19 to 16.

A blank station card lever CL6 has a transfer contact which detects and transfers when a card is at the blank station (i.e., between card lever CL5 and stud 117) to open a circuit from the drum controlled circuit breaker cam DC8 during a reread operation to disengage the clutches 67, 69 and 78, 80 so no more cards will be fed onto drum 22. Also, it cooperates with CL3 to detect the end of a reread operation in the manner presently to be explained.

Five basic operations are performed by the programming apparatus: load drum, eject, card advance (read), reread, and unload drum. As illustrated, the card advance (read), eject, and reread operations are initiated by pulses delivered from a utilization device UD through plugboard connections PB3, PB4, and PB5, respectively (FIG. 7B). Only the load drum and unload drum operations are locally initiated by the operator.

The programming apparatus comprises a plurality of relays, each of which will be denoted by the prefix R; and the various contacts thereof will be denoted by lower case letters. Also, the abbreviation "N/C", for normally closed, will be used to designate a contact closed when a relay is deenergized; and "N/O", for normally open, will be used to designate a contact closed only when the relay is energized. Also, for facility of understanding during subsequent description, the legends UR, LR, UL, LL, respectively, will be used where helpful to refer to the location of a particular element as being in the upper right, lower right, upper left or lower left quadrant of a particular sheet of FIG. 7. Moreover, where a wire extends from one sheet of FIG. 7 to another both portions of such wire will be numbered with the same reference numeral to facilitate tracing circuits.

R1 is a parity bypass relay which when energized sets up a shunt circuit during loading of the drum 22 to bypass the parity circuits which require that an odd number of holes be punched in each column of the card. R2 is a reset buffers relay which is energized to cause resetting of twelve buffer odd-column relays (R114, R115, R117, R119, R120, R122, R123, R125, R126, R128, R129, R131) and resetting of twelve buffer even-column relays (R132, R134, R136, R137, R139, R140, R142, R143, R145, R146, R148, R149), so that new information can be read into these buffer relays. Card advance relay R3 is energized in response to a signal given from the utilization device UD via PB 3 to cause the drum 22 and hence a card on the drum to advance a limited amount so the next two columns will be read. Eject relay R4 is energized to initiate an eject cycle whereby the drum will uninterruptedly advance until column "1" of the next card is brought to the read station 24. Eject hold relay R5 holds an eject command. Reread relay R6 is energized by a signal transmitted from device UD via PB5 to initiate rereading of a card on the drum 22. Relay R7, when energized, verifies that the buffer relays R114 to R149 have reset in accordance with the command given by energization of R2.

Buffer transfer control relays R8, and R21 are concurrently deenergized when the escape odd magnet 63 is to be energized to permit escapement of the drum 22 from an odd to an even column position; and said relays are concurrently energized when the escape even magnet 64 is to be energized to permit escapement of the drum from an even to an odd column position. Relays R9 and R19 verify that the escape odd magnet 63 and escape magnet 64, respectively, have actually been energized and that contacts 63a, 64a have therefore opened to permit escapement of the drum.

Relay 10 is energized when ever a card is in the chute and closes chute card lever CL1. Buffer ready relays R13, R14, R15 are in the nature of interlocks which control the time at which information in the buffer relays is transmitted to the utilization device. The functions of R13, R14, R15 are the same, three relays being provided only to obtain the needed number of contact points. Hold command relay R16 serves as an interlock to refuse a new command until the prior command is properly cancelled or superseded.

Relay R101 (try escape) when energized indicates that the card should have been read and the drum should now be trying to escape. Relay R108 (trying read) when energized indicates that the star wheels 95 should be reading a card. The functions of these and various other relays will become apparent from subsequent description of operation.

It should here be mentioned, however, that the utilization device UD may be a program control device which supervises a series of successive steps of a checkout program that is set up in a deck of punched cards. In the arrangement illustrated, the first two columns of each card contain information identifying the particular checkout step supervised by the data punched into the remaining columns of the card. Hence, the star wheels 95 read columns "1" and "2" of each card, storing the information in buffer relays R114 to R149; then after said columns are read, the drum escapes to column "3" position and at buffer ready time (when R13, R14, R15 are energized), the identifying code information is transmitted to device UD. Device UD then analyzes this information and answers back with one of three signals. If it is interested in the program covered by the card just read, it will transmit a pulse via PB3 to pick card advance relay R3 so that the apparatus will respond by reading the next two columns of the card, then transmit such information to the device UD and await a new command; thus, as repeated card advance signals are given, the entire card will be read in two-column increments.

However, at any time (when the card is waiting at column "3" or any other odd column position), the device UD may decide that it is not interested in any more information from this card, and accordingly it may transmit a pulse via PB4 to pick eject relay R4 to initiate an eject cycle. In such case, the drum will move uninterruptedly until column "1" of the next card arrives at the read station, and then after columns "1" and "2" of that next card are read, the drum will escape to and wait at column "3" position for another signal from the device UD.

On the other hand, at any time, the device UD may after appraising the information it has received, decide that the card which has just been read or a previous card still on the drum should be reread, for instance, because the unit being checked out has failed to pass a test point. In this event, a pulse is transmitted via PB5 to pick reread relay R6 to initiate a reread operation during which cards on the drum will be recirculated past the read station and no new cards will be added until the drum has completed at least one full revolution. In other words, it is possible for the cards to be recycled and reread more than once.

For sake of simplified illustration, the utilization device UD is shown as comprising three contacts k, m, n which when closed connect a B+ line to the connectors PB3, PB4, PB5, respectively. Closure of these contacts can be manually effected by an operator after he visually observes and evaluates and compares the information read out from the buffer relay R114 to R149 with this test or other data; however, it is contemplated that the device UD will operate automatically to evaluate the information and control operation of the drum 22 and associated structure herein shown in detail.

OPERATION

Assume initially that a deck of program cards 11 is in the hopper-stacker, but that no cards are in chute 14, 15 or on drum 22; that hopper door 28 is closed to close a hopper door interlock switch 200 (FIG. 7B–UR); and an on-off switch 201 (FIG. 7B–UL) is closed. Assuming now that the utilization device applies an A.C. voltage across plugboard connectors PB1, PB2, the motor M will operate to supply power to belts 39, 42, 44 to drive the CR cams and roll 20. Also, power supplied across connectors PB1, PB2 will be converted by a transformer 203 and a rectifier 204 to supply a predetermined lower D.C. voltage to supply line B to provide power for operating the various relays in the manner presently to be described. The rolls 19 to 16 and picker knife cams 84, 85 will not be driven from motor M, however, until clutches 67, 69 and 78, 80 are engaged. The various components will now be in the respective positions in which they are shown in the drawings.

To Load Drum

To transport card from the hopper-stacker 10 to the drum 22, a push-button load drum switch SW1 is closed to the operator. This completes a circuit from supply line B (FIG. 7D–UL) through card lever contact CL3 N/C, R10a N/C, load drum switch SW1 now closed, a diode 205, and via a wire 300 to R152d N/C (FIG. 7B–UL), R5d N/C, pick coil P of R4, hopper door switch 200, card lever CL5 to ground, thus energizing eject relay R4. The contacts of card levers CL3 and CL5 are closed because no cards are now at the read station 24 or stacking check station (FIG. 1). When eject relay R4 is picked, an eject cycle is initiated.

Eject Cycle

Figure 7A:
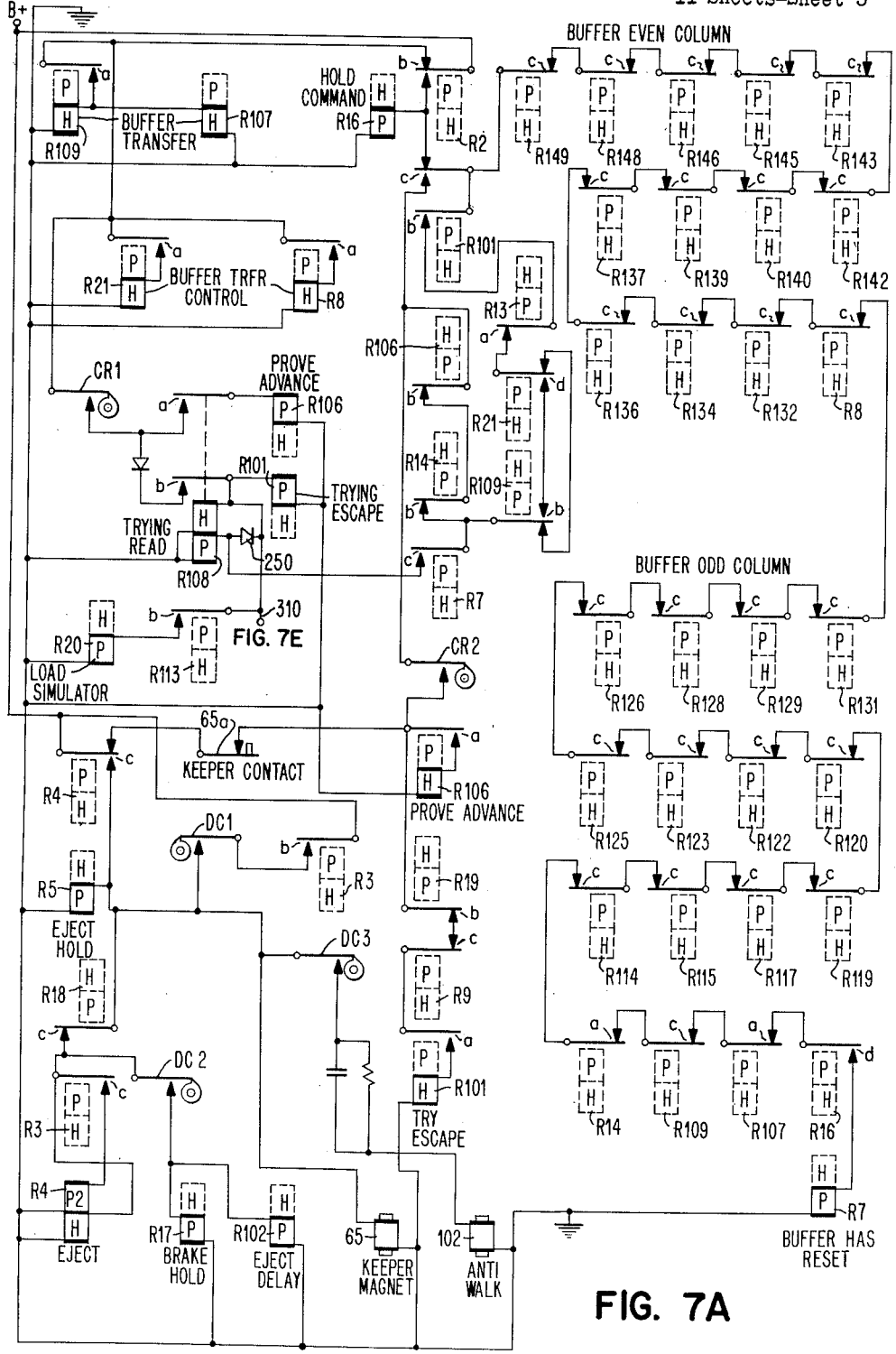
Figure 7B:
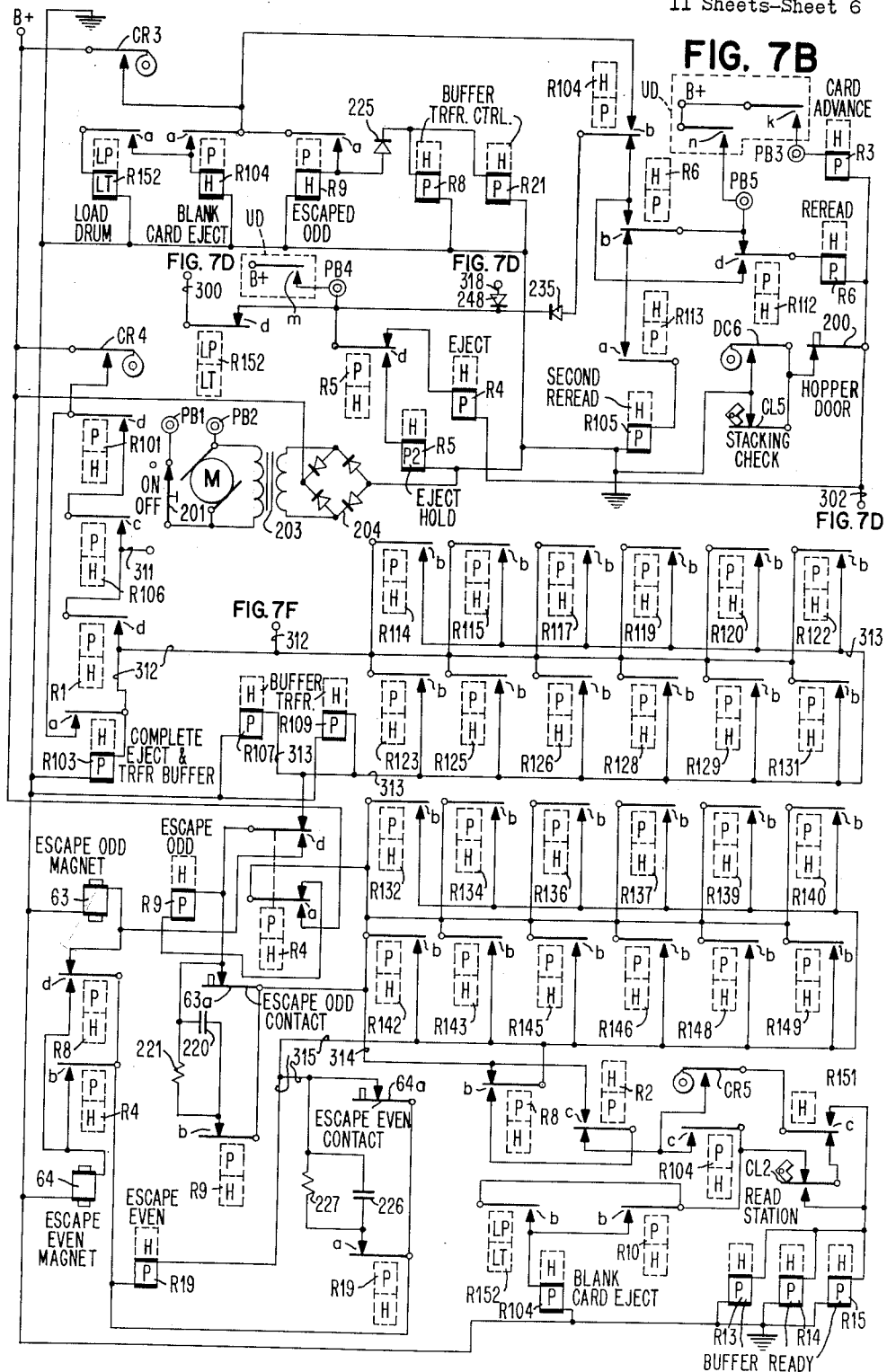

When eject relay R4 is picked, various circuits are completed from supply line B to ground through R4c N/O (FIG. 7A–LL). One is via keeper magnet 65 to energize it. Another is via coil P of eject hold relay R5 to pick said relay. Another is via R4c N/O, R18c N/C hold coil H of relay R4 to ground to energize hold coil H of R4. Another is from line B through R4a N/O (FIG. 7B–LL), escape odd contact 63a, R4d N/O, and the coil of escape odd magnet 63 to ground to energize magnet 63. Also a branch circuit is set up via R4a N/O through R8b N/C, a wire 315, escape even contact 64a, R4b N/O, and the coil of escape even magnet 64 to ground to energize magnet 64. With magnets 65, 63, 64 energized, their armatures x will be attracted and drum 22 will now be unlatched and start rotating through power delivered from the slip clutch 50, 53, 51 (FIG. 1).

With eject hold relay R5 picked, its hold coil H will be energized via a circuit completed from line B through R16a N/C (FIG. 7D–UR) R5b N/O and hold coil H of R5 ground; and coil P2 of relay R5 will be energized via line B, CL3 (FIG. 7D–UL), R10a N/C, SW1, wire 300, R152d N/C (FIG. 7B–UL), R5d N/O, coil P2 of R5 to ground. R5 hold coil H will remain energized until R16 is picked, and R5 coil P2 will remain energized until R152 is picked.

Meanwhile, as soon as eject hold relay R5 is picked, load drum relay R152 will be picked via a circuit completed from line B through CL3 (FIG. 7D–UL), R10a N/C, load drum switch SW1, R5a N/O now closed, latch pick coil LP of R152 and a wire 302 through hopper door switch 200 (FIG. 7B–UR) and thence via CL5 to ground. With relay R152 energized, R152d N/C (FIG. 7B–UL) will open, thus cutting out the circuit leg from line B through load drum switch SW1 to wire 300. This means that once push button type load drum switch SW1 is closed just long enough to initiate an eject cycle, the switch may be released by the operator; and if it is not released at the proper time, the leg of the circuit including said switch will be opened anyway; also another load drum command cannot be given by depressing SW1 until R152 has dropped out.

The purpose of load drum relay R152 is to take the place of relay R10 in energizing the magnets 91, 92 (FIG. 1) that control the clutch 67, 69 (which controls both the feed rolls 19 to 16 and picker knife cams 84, 85) and clutch 78, 80 (which independently controls said cams). One complete cycle (ninety degress of drum rotation) is necessary to effect engagement of these clutches so that cards can be fed by the picker knife 13. When toward the end of the second cycle, cards are fed into the chute and reach chute card lever CL1, relay R10 will be energized and take over from relay R152, as will presently be described.

Figure 7D:
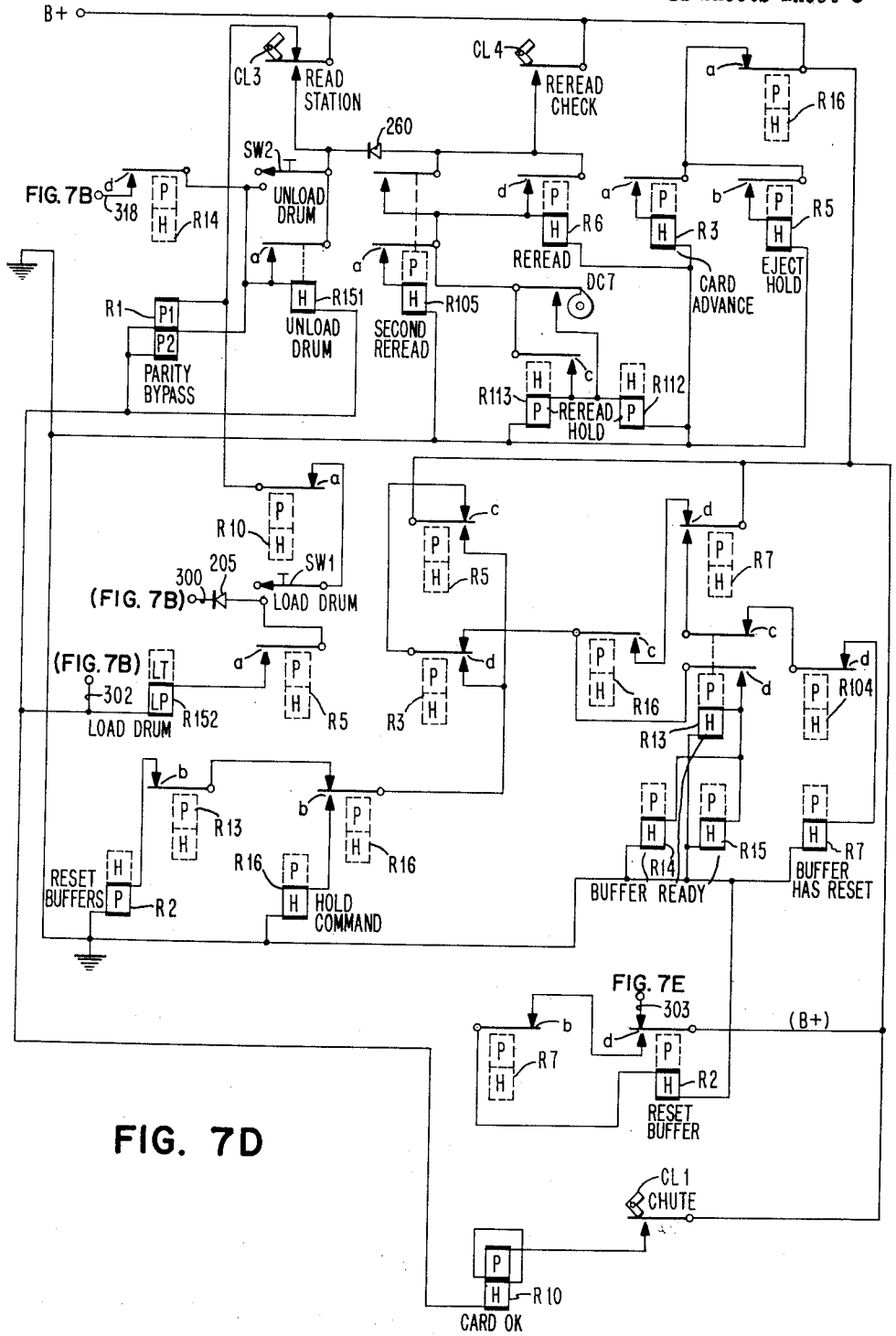
Figure 7E:
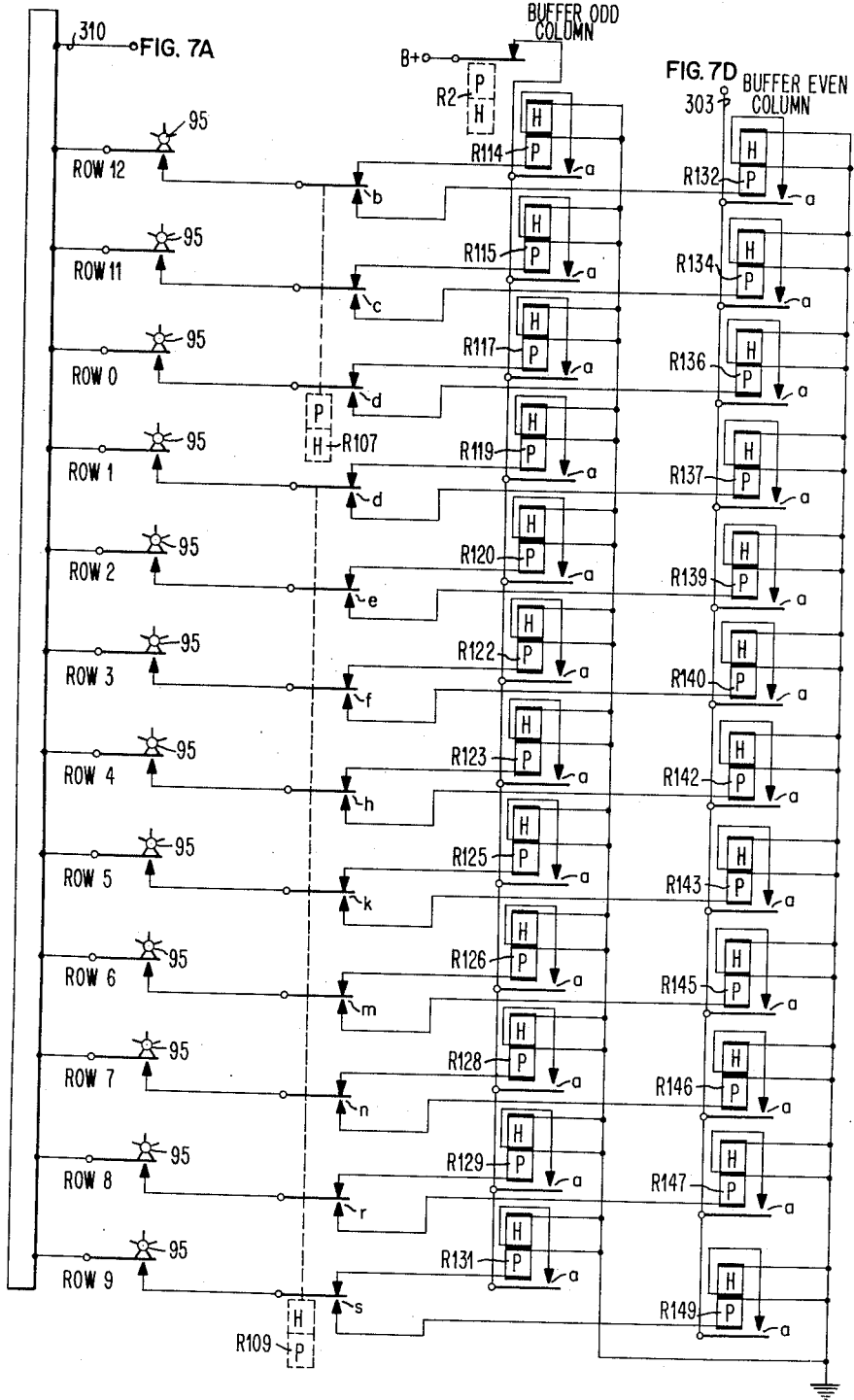
Figure 7F:
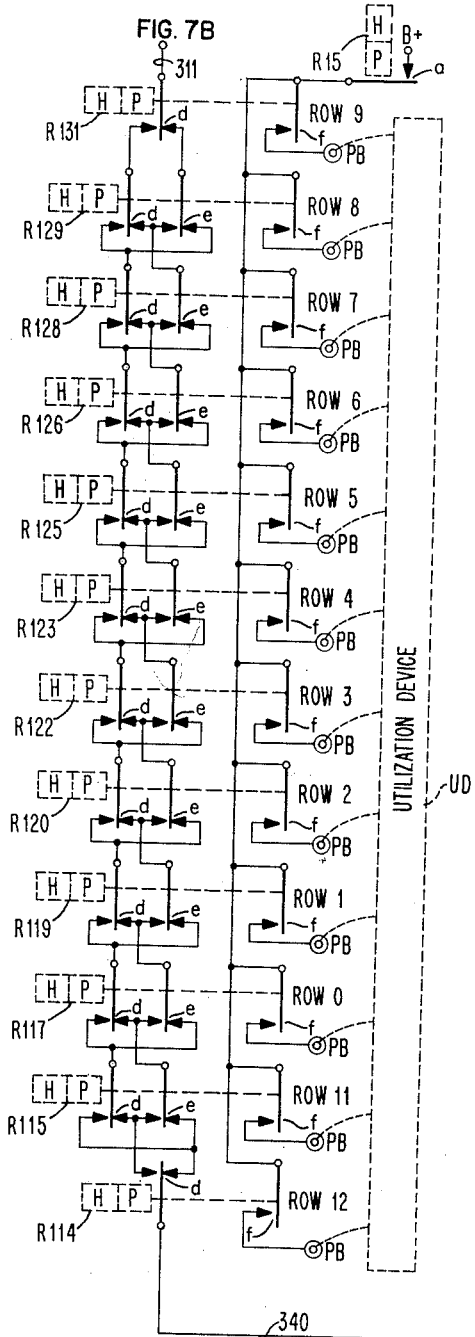
Figure 7F:
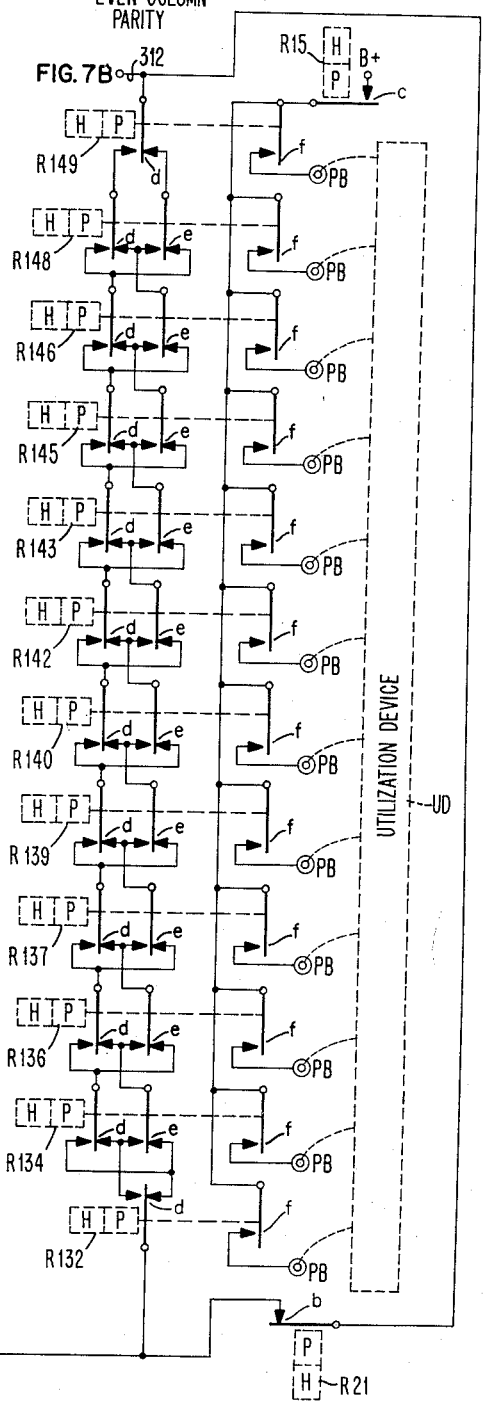

Meanwhile, relay R2 (reset buffers) is picked through a circuit completed from line B through R5c N/O (FIG. 7D–center), R16b N/C, R13b N/C, and pick coil P of R2 to ground to call for the buffer relays R114 to R149 to reset. Relay R2 is held through a circuit completed through line B, R2d N/O (FIG. 7D–LR), R7b N/C, and hold coil H of R2 to ground. When relay R2 is picked, contact R2a N/C (FIG. 7E–UR) is opened to deenergize and thus reset buffer odd relays R114 to R131; and R2d (FIG. 7D–LR) transfers to cut off wire 303 from line B, to deenergize and thus reset buffer even relays R132 to R149 (FIG. 7E–UR). Relay R2 is held only long enough to pick relay R7 which denotes that the buffer has reset.

Meanwhile, with relays R2 and R5 energized, hold command relay R16 is picked through a circuit from line B through R2b N/O (FIG. 7A–UL), pick coil P of R16 to ground. Relay R16 is held through a circuit from line B through R5c N/O (FIG. 7D–center), R16b N/O, and hold coil H of R16 to ground. When R16 is energized, relay R7 is picked through a circuit from line B through R2b N/O (FIG. 7A–UL), R101c N/C, then through the buffer even relays R149c N/C, R148c N/C, R146c N/C, R145c N/C, R143c N/C, R142c N/C, R140c N/C, R139c N/C, R137c N/C, R136c N/C, R134c N/C, R132c N/C in series, then through transfer buffer control relay R8c N/C, and then through the odd buffer relays R131c N/C, R129c N/C, R128c N/C, R126c N/C, R125c N/C, 123c N/C, R122c N/C, R120c N/C, R119c N/C, R117c N/C, R115c N/C and R114c N/C, thence through buffer ready relay R14a N/C, buffer transfer relays R109c N/C and R107a N/C, hold command relay R16d N/O, and pick coil P of R7 to ground. Relay R7 (buffer has reset) is then held through a circuit from line B, R7d N/O (FIG. 7D–UR), R13c N/C, R104d N/C, hold coil H of R7 to ground. Thus relay R2 (reset buffers) will drop out as soon as R7 is picked and opens the R7b N/C point (FIG. 7D–LR). Thus, the buffer relays have reset and this fact has been verified by the energization of R7, which would not have become energized if any one of the buffer relays R149 to R114 had not dropped out. Also, after relay R2 drops out, relay R16 (hold command) will remain energized through its hold circuit (above described), until relay R5 drops out; and relay R7 will stay energized as long as relay R13 (buffer ready) and relay R104 (blank card eject) are deenergized. During this period the motor-driven CR cams and the drum-controlled DC cams are rotating but not performing any significant function. The apparatus has merely verified that the buffer relays R114 to R149 have reset and that it is now ready to read new information into the buffer relays.

During this period and while relays R17 and R18 remain concurrently deenergized, a capacitor 207 (FIG. 7C–UR) will be charged from line B through R17b N/C, and thence in bypass of a diode 208, through capacitor 207, R17c N/C, R18d N/C, and a resistor 209 to ground. Also, until relay R18 is picked, a capacitor 210 will be charged via a circuit from line B through R18a N/C (FIG. 7C–UL), a diode 211, a resistor 212 shunting a diode 213, and then via capacitor 210, to ground.

When drum-controlled circuit breaker cam DC-2 makes at column "70," brake hold relay R17 is picked to initiate operation of a brake circuit to decelerate the drum 22 before column 1 of the next cycle or quadrant is reached, as will now be described. R17 and also eject delay relay R102 are picked by a circuit from line B through R4c N/O (FIG. 7A–LL), R18c N/C, DC2, thence in a parallel through pick coils P of R17 and R102 to ground. As soon as R17 is picked, charging of the capacitor 207 ceases. R17 is held by a circuit from line B through R18a N/C (FIG. 7C–UL), diode 211, R17a N/O, and hold coil H of R17 to ground.

At column "75" time and until column "2½" time, drum controlled circuit breaker cam DC5 (FIG. 7C–UL) makes and completes several circuits from line B to ground. One is through DC5, R102a N/O and hold coil H of R102 to hold the latter. Another is via DC5, R112b N/C and magnet 91 to energize the latter to permit spring 68 to kick dog 67 in and engage the secondary clutch 67, 69 at the proper time. Another is via DC5, R112b N/C and stacking brake coil 125a to energize the coil to create some rotational drag on roll 125 and hence on a card if then engaged by said roll, which of course is not now the case. Still another circuit is completed through DC5 via R112b N/C, R151b N/C, R152c N/O, a resistor 215 and capacitor 216 in parallel, and feed knife clutch magnet 92 to energize said magnet to permit spring 79 to kick in the dog 78 and engage clutch 78, 80 at the proper time. Thus, toward the end of the first cycle, the feed rolls 19 to 16 and picker knife 13 will start to operate, and the picker knife will be activated to feed a card into chute 14, 15 during the second cycle.

It should here be noted that load drum relay point R152c N/O (FIG. 7C–LL) and relay point R10d N/O are connected in parallel between R151b on the one hand and the resistor 215 and capacitor 216 on the other; hence, when DC5 makes, the feed knife clutch magnet 92 can be energized if either relay R152 or R10 is energized. Load drum relay R152 is used during a load operation to effect energization of the feed knife clutch magnet 92 because R10 will not then be energized since no cards are in chute 14, 15 and CL1 will hence be open (see FIG. 7D–LR); however, after CL1 is closed by a card fed into the chute during the second cycle, R10 will thereafter perform the function that had been performed by R152.

Meanwhile, cam DC3 (FIG. 7A–LL), which has been made since column "1" time, breaks at column "77½" time; and magnet 102 (which had been picked when R5 was picked) drops out, causing comb 97 (FIG. 1) to be spring-biased toward the drum 22.

Then, at column "83" time cam DC4 (FIG. 7C–UR) makes to pick brake time relay R18 via a circuit from line B through DC4 pick coil P of R18, and a diode 215 to ground. R18 is then held by a circuit from line B through R18a N/O (FIG. 7C–UL), R17d N/O, and hold coil H of R18 to ground. Also, magnetic brake 93 is pulsed via a circuit set up from line B through DC4 a diode 216, diode 208, R17b N/O and brake 93 to ground; the diode 208 and capacitor 207 constitute a temporary voltage doubler circuit for the magnetic brake to decrease its application operating time, after which it is held by line B voltage upon discharge of the capacitor. Brake 93 imposes a drag on brake pinion 94 (FIG. 1) to decelerate drum 22. To assure that the brake 93 will be released a predetermined time interval after it was initially activated by the making of DC4 and the consequent pick up of R18, and adjustable time-out circuit is provided which includes a capacitor 210 (FIG. 7C–UL). Thus, even though picking of R18 will open contact points R18c N/C (FIG. 7A–LL) and R18a N/C (FIG. 7C–UL) through which the pick and hold coils P and H of R17 were energized, respectively, R17H will be held a desired time until capacitor 210 discharges, said time being adjustable by a rheostat 217 (FIG. 7C–UL).

Meanwhile, when R18c N/C contact opens (FIG. 7A–LL), hold coil H of R4 will be deenergized and cause eject relay R4 to drop out. This will open R4c N/O (FIG. 7A–LL) to deenergize keeper magnet 65, and also open R4d N/O (FIG. 7B–LL) to deenergize escape odd magnet 63 and escape even magnet 64. However, since the ratchets 60, 61, 62 have smooth, large diameter peripheral portions between columns "83" and "90" which will be engaged by the respective armatures x of magnets 63, 64, 65, the contacts 63a, 64a, 65a respectively, of these magnets may be open between column "83" time and column "90" time.

At column "90" time, whether or not cards are in chute 14, 15 circuit breaker cam DC8 (FIG. 7C–LR) will make to complete a circuit from line B through blank station card lever CL6 N/C, DC8, R112c N/C and auxiliary feed solenoid 113 for actuating link 114 (FIG. 2) to rock shaft 115 and carry idler roll 21 (FIG. 1) into contact with the rotating accelerating feed roll 20 to drive a card on to the drum 22 if a card is then pinched by the rolls 20, 21; however, since a card has not yet reached these rolls, it will not be driven onto the drum during this particular cycle.

Drum 22 is stopped at column "1" by the armature x of escape odd magnet 63 engaging the column "1" tooth on ratchet 60, and the armature x of keeper margnet 65 drops in the column "1" tooth of ratchet 62; whereupon, all three contacts 63a, 64a, 65 will close in the manner previously described in detail.

Actually during this phase of the load operation, no card is yet at the read station; hence, antiwalk comb 97 will be down and all twelve star wheels 95 at said station will be resting on the drum 22 (rather than on a card), just as if twelve holes were punched in column "1" of the non-existent card. Since parity is obtained only when an odd number of holes is punched in any one card column, it is obvious that parity would not be obtained during this loading operation and operation would cease. Therefore, to eliminate or bypass the parity requirement at this time, the parity bypass relay R1 is provided. This relay R1 is energized via a circuit through read station card lever CL3 N/C (FIG. 7D–UL), pick coil P1 of R1, wire 302, hopper door switch 260 (FIG. 7B–UR) and stacking check CL 5 to ground. Thus, R1 will be energized unless a card is at the read station (indicating parity is required) or at the stacking check point; and hence R1 will now be energized at this stage of the load operation. However, the star wheels 95 will go through the motions of reading in the following manner.

Drum 22 will wait at column "1" position (and thus the drum-controlled DC cams will stop rotating) until cam CR2 (which is being rotated by the motor M even though the drum has stopped) makes at 0° and the process of reading the first two columns of the card begins. It is to be noted that the timings of the drum-controlled DC cams and the motor-driven CR cams are not synchronized, and hence the armatures x of escape odd magnet 63 and keeper magnet 65 can engage the colmn "1" teeth of ratchets 60, 62, respectively, anywhere in the CR timing cycle.

Meanwhile, when CR2 makes at 0° of its revolution, relay R101 (try escape) and R108 (trying to read) are picked through a circuit from line B through R4c N/C (FIG. 7A–LL), now closed contact a of keeper magnet 65, CR2, R106b N/C, R14b N/C, R7c N/O and thence to ground via pick coil P of R108 and also to ground via a diode 218 and pick coil P of R101 and also to ground via a diode 218 and hold coil H of R108 to hold R108. R101 is held through a circuit from line B through R4c N/C (FIG. 7A–LL), keeper contact 65a, R19b N/C, R9c N/C, R101a N/O, to ground until R9 or R19 or keeper magnet 65 or R4 is energized. The star wheels 95 will then be energized independently of R108 and R101 via a branch of the above circuit leading via said diode 218 through a wire 310 to each of the twelve star wheels in parallel (FIG. 7E–UL), and thence (because no card now is at the read station) through each star wheel and respective N/C contacts of deenergized relays R107 or R109 to pick the respective pick coils P of all of the buffer odd column relays R114 to R131, since buffer transfer relays R109 and R107 are now deenergized. It is to be understood, however, that when a card is at the read station 24, the only relays of this group R114 to R131 that would be picked would be those effectively connected to a particular star wheel 95 which read a punched hole in column "1" of the card.

Now when CR1 makes at 48° of its revolution, prove advance relay R106 will be picked through a circuit from line B through R2b N/C (FIG. 7A–UL), CR1, R108a N/O, pick coil P of R106 to ground, because R108 is now picked. Reading of column "1" will be completed between the time CR2 makes (at 0°) and CR1 breaks (at 126°). Some time after CR4 makes the drum 22 will escape from column "1" to column "2" position, in the manner now to be described.

When cam CR4 makes at 114° of its revolution, a circuit is completed from line B through CR4 (FIG. 7B–UL), R101d N/O, R106c N/O, parity bypass relay R1d N/O (which is energized because no card is now at the read station), a wire 312, pick coil P of R103 to ground to pick relay R103 (complete eject and transfer buffer relay). Also escape odd magnet 63 is energized through a circuit extending via wire 312 and the b N/O points of all odd column buffer relays R114 to R131 in parallel (since they are all picked because no card is at the read station) and a common wire 313, R4d N/C, escape odd contact 63a, wire 314, R8b N/C, wire 315, escape even contact 64a, R8d N/C, and escape odd magnet 63 to ground, because pick coil P of R9 is shunted out by contact 63a. When magnet 63 is energized, escape odd contact 63a opens and causes a capacitor 220 to charge in bypass of a resistor 221 through R9b N/C. This reduces the voltage on the escape odd magnet coil and increases the voltage across escaped odd relay R9, until R9 is picked via the shunt circuit between R4d N/C and wire 314, which shunt circuit includes pick coil P of R9 and R4a N/C. When R9 is picked, R9c N/C opens (FIG. 7A–LR) to drop try escape relay R101. R106 will drop out when keeper contact 65a opens, which will occur only if and when said contact is mechanically moved by and during a card advance. This opening of contact 65a verifies that the drum 22 has advanced one column (in this instance, from column "1" to column "2").

Meanwhile, as soon as CR4 makes, buffer transfer relays R107 and R109 (FIG. 7B–center) will each be picked through a respective branch of wire 313 and their respective pick coils P. R107 and R109 are held by a circuit from line B through R2b N/C (FIG. 7A–UL) and R109a N/O thence to ground via separate legs through the respective hold coils H of R107 and R109. Relays R107 and R109 are picked and held to prepare for reading the next column (column "2") into the even buffer relays R132 to R149.

Thus when CR4 makes, circuitry is set up to call for an eject to retain the information in the odd column buffer relays R114 to R131 and cut in the even column buffer relays R132 to R149 for sensing the next column, which in the present instance is column "2." R103 (complete eject and transfer buffer relay) must be held to bypass R101 (try escape) and R106 (prove advance) because the latter will drop out. R103 is held via R103a N/O (FIG. 7B–LL) which is shunt-connected to the R103 pick coil P and CR4 in bypass of R101d N/O, R106c N/O, and R1d N/O.

When cam CR3 makes at 348° of its revolution, the escaped odd relay R9 (which had been picked after CR4 made at 114°) will be held via a circuit from line B, through CR3 (FIG. 7B–UL), R9a N/O, and hold coil H of R9 to ground; and buffer transfer control relays R8 and R21 will be picked via a circuit including said R9a N/O, a diode 225, and parallel connections to ground through pick coils P of R8 and R21. R8 will be held through a circuit from line B through R2b N/C (FIG. 7A–UL), R8a N/O and hold coil H of R8 to ground; and R21 will be held via a branch of said circuit including R2b N/C, R21a N/O and hold coil H of R21. (R8 and R21 control which escape magnet 63 or 64 will be energized during an escapement).

The drum 22 will now wait at column "2" position, until cam CR2 makes again at 0°. A pulse will now be sent to all twelve star wheels 95 (because no card is yet at the read station) in the same manner as previously described in connection with the making of cam CR2 while the drum was at column "1" position. However, since buffer transfer relays R107 and R109 are now held energized via branch circuits including R2b N/C (FIG. 7A–UL), as above described, the pulse supplied to each of the star wheels 95 in parallel via wire 310 (FIG. 7E–UL) will be transmitted via respective N/O contacts of R107 or R109 to the pick coils P of all of the buffer even column relays R132 to R149 to energize all of said relays R132 to R149. If a card were now at the read station 24, the only relays of this group R132 to R149 that would be picked would, of course, be those which are effectively connected to a particular star wheel 95 that contacted the drum by "reading" through a punched hole in column "2" of the card.

Thus, buffer transfer relays R107 and R109 are concurrently energized to cause punched holes sensed by any of the star wheels 95 in an even column of a card to be read into the associated buffer even column relay R132 to R149; whereas relays R107 and R109 are concurrently deenergized to cause punched holes sensed by any of the star wheels in an odd column of a card to be read into the associated buffer odd column relays R114 to R131.

When cam CR4 again makes at 114° of its revolution, the drum 22 will escape from column "2" to column "3" position. Relay R103 (complete eject and transfer buffers) will be picked and held via circuitry previously described in connection with escape of the drum to column "2" position. However, the escape even magnet 64 will be energized (instead of the escape odd magnet 63) and R19 (instead of R9) will be picked because R8 and R21 will continue to be held until R2 is again energized. This is accomplished by a circuit, closed by CR4, and extending from line B through CR4 (FIG. 7B–UL), R103a N/O, wire 312, the b N/O points of all buffer odd relays R114 to R131 in parallel (because no card is yet at the read station 24), then through wire 313, R4d N/C, escape odd contact 63a, all the b N/O points of buffer even relays R132 to R149 in parallel (since no card is at the read station) to common wire 315, thence through escape even contact 64a, R8d N/O, and the coil of escape even magnet 64 to ground to energize magnet 64 and thus open contact 64a to permit escape of the drum from the even column "2" to the odd column "3". As soon as contact 64a opens, a capacitor 226 will be charged, in bypass of a resistor 227, through R19a N/C. This will reduce the voltage across the coil of escape even magnet 64 and increase the voltage across escape even relay R19 until R19 is picked via a shunt circuit extending from wire 315, in bypass of open contact 64a, through pick coil P of R19 and thence via R8d N/O and escape even magnet 64 to ground. When escape odd relay R19 is picked, R19b N/C (FIG. 7A–LR) opens to drop try escape relay R101. R106 will drop out when keeper contact 65a opens and thus verifies that the drum 22 has escaped from column "2" to column "3".

A complete cycle is considered to run from column "3" of one card or drum quadrant to column "3" of the next card or quadrant.

Since there is now still no card at the read station 24, the apparatus will automatically give itself an automatic eject command to produce another eject operation to advance the drum 22 to the next quadrant. This automatic eject command will be initiated by picking of blank card eject relay R104 when CR5 makes at 144° of its revolution. R104 is picked through a circuit including wire 315, R8b N/O (FIG. 7B-LR), R2c N/C, CR5, R151c N/C, CL2 N/C, R152b N/O, and pick coil P of R104 to ground, it being noted that R152 is still being held.

When CR3 makes (at 348°), R104 will be held through a circuit from line B through CR3 (FIG. 7B-UL), R104a N/O, and hold coil H of R104 to ground; and current will also flow via R104a N/O and R152a N/O through latch trip coil LT of R152 to ground to drop the load drum relay R152 which had been held since initiation of the eject cycle by depression of load drum switch SW1. Also when CR3 makes, a circuit will be completed through R104b N/O (FIG. 7B-UR), a diode 235, R5d N/C, pick coil P of eject relay R4, hopper door switch 200 and stacking check card lever CL5 to ground to pick relay R4 and thus initiate an automatic eject cycle in the same manner as already described in connection with the load drum eject cycle.

During this automatic cycle the drum 22 will advance uninterruptedly from column "3" to column "1" position in the next quadrant, and then advance column-by-column from column "1" to column "3" position. During this column-by-column advancement, R10 will take the place of load drum relay R152 which had been energized by a manual command and has now dropped out. R10 will be energized through a circuit from line B through chute card lever CL1 (FIG. 7D-LR), pick and hold coils P and H of R10 in series, wire 302, hopper door switch 200 (FIG. 7B-UR) and CL5 to ground, because a card will now be in the chute and close CL1. R10b N/O (FIG. 7B-LR) now replaces R152b N/O in the energization circuit for R104 during an automatic eject.

The automatic eject cycles will be repeated until a card arrives at the read station 24, at which time loading of the drum will be completed.

*Reading Columns "1" and "2" of a Card*

When a card arrives at read station 24, reading will commence when cam CR2 makes and provides a pulse to the star wheels 95 to read information from the punched holes in column "1" into specific ones of the buffer odd-column relays R114 to R131. Cam CR1 later makes to continue the pulse to the star wheel 95 so they continue the reading. However, with a card at the read station 24, there is a difference in the control of escapement of drum 22.

Parity will now be required because read station card lever CL3 N/C point (FIG. 7D-UL) will have opened due to the presence of a card at the read station and hence have prevented picking of parity bypass relay R1 via said point. Assume now that R101 (try escape) and R106 (prove advance) are already picked, as heretofore explained. When cam CR4 makes, a circuit will be completed from line B through CR4 (FIG. 7B-UL), R101d N/O, R106c N/O, wire 311, thence (FIG. 7F-UL) through a conventional odd-column partity circuit (including transfer contacts e and/or d of R131 to R114) which requires that the star wheels 95 read an odd number of punched holes in the odd column "1" in order to complete the circuit through a wire 340, R21b N/C (FIG. 7F-LR), a branch of wire 312, the b N/O points (FIG. 7B-UR) of at least one of the buffer odd columns relays R114 to R131, common wire 313, and thence via pick coils P of buffer transfer relays R107 and R109 in parallel to ground. Thus, with R1d N/O now open, wires 311, 312 will be connected and R107 and R109 will be picked only if the parity circuit denotes the parity requirement is satisfied. Thereafter, the escape odd magnet 63 will be energized and permit the drum 22 to escape from column "1" to column "2" position, the same as during the load operation already described.

Information will now be read by the star wheels 95 from column "2" of the card in essentially the same manner as already described, with two exceptions. Since the buffer transfer relays R107, R109 are now energized, information from column "2" will be read into the buffer even column relays R132 to R149 (instead of R114 to R131). Also buffer transfer control relays R8 and R21 are now energized. With R21b N/C (FIG. 7F-LR) now opened, it will be apparent that in order to complete the circuit between wires 311 and 312, the pulse delivered to wire 311 when CR4 makes must now not only pass through the odd-column parity circuit but also in series through the even column parity circuit including e and/or d points of buffer even relays R132 to R149; in other words, parity must have been obtained in both columns "1" and "2" to escape the column "3". If parity is obtained, then during CR4 time, the escape even magnet 64 will be energized to permit escapement of the drum 22 to column "3", in the same manner as described in connection with escape to column "3" during the first eject cycle, the only difference being that R1d N/O is now bypassed.

Thus information has bene read from column "1" of the card into an odd number of the buffer odd relays from group R114 to R131, and also read from column "2" into an odd number of the buffer even relays from the group R132 to R149. The information contained in these first two columns indicates what program has been punched in the remainder of the card. The drum 22 has escaped to column "3" and stops; but this information is retained by the buffer relays until it is transferred to the utilization device UD in the following manner.

When cam CR5 makes, a circuit is completed via wires 313 and 315, R8b N/O (FIG. 7B-LR), R2c N/C, CR5, R151 N/C, read station card lever CL2 N/O, and pick coils P of buffer ready relays R13, R14, R15 because a card is now at the read station. These relays are held via a circuit completed from line B through R7d N/C (FIG. 7D-UR), R16c N/O, R13d N/O and parallel legs leading through the hold coils H of R13, R14, R15 to ground. When R15 is picked, R15a N/O and R15c N/O (top FIG. 7F) will make, and thus cause the information from columns "1" and "2" which has been stored in the buffer relays R114 to R149 to be transmitted via the unnumbered connectors PB (FIG. 7F) to the utilization device UD for analysis. The drum 22 will remain at column "3" position until the utilization device UD gives one of three answer-back signals. As previously explained, these signals will be to read more of the same card, skip to and read the next card, or reread the same or a previous card. Operation in response to each of these three signals will now be described in detail.

*Reading Columns "3" Through "80" of a Card*

Assume now that while buffer ready relays R13 to R15 are picked and the drum 22 is stopped at column "3" position, the utilization device UD decides it has found the card it wants. To have this card read completely, card advance relay R3 (FIG. 7B-UR) is picked by a pulse transmitted via UD contact k, PB3, pick coil P of R3, switch 200 and CL5 to ground. R3 is held via a circuit from line B through R16a N/C (FIG. 7D-UR), R3a N/O and hold coil H of R3 to ground until hold command relay R16 is picked. This will initiate a read cycle wherein the cards will be read in successive two-column increments; that is, information from column "3" and then column "4" will be read into the appropriate groups of buffer relays, and the information from both said columns will be retained by said relays and transmitted to the utilization device UD while the drum 22 escapes to column "5."

More specifically, before reading successive odd columns (like "3," "5," etc.) it is necessary in each case to reset the buffer relays (initiated by picking R2) and then verify (by picking R7) that these relays have reset. This is accomplished in generally the same manner as described in connection with the reading of columns "1" and "2" during an eject cycle with two minor differences. R2 now will be picked through a circuit from line B through R5c N/C (FIG. 7D–middle), R3d N/O, R16b N/C, R13b N/C and pick coil P of R2 to ground because eject hold relay R5 is now deenergized and card advance relay R3 is now energized. When R2 picks, hold command relay R16 will be picked. When R16 is picked, card advance relay R3 will drop out because R16a N/C will be opened and thus break the hold circuit for R3.

Now, if and when all the buffer relays R114 to R149, the buffer transfer relays R107, R109, and the buffer transfer control relays R8, R21 drop out, R7 (buffer has reset) will be picked. If R7 is picked, then when cam CR2 makes, a pulse will be transmitted to the star wheels 95 to start a read cycle during which parity must be obtained to permit escape from column "3" to column "4." Then column "4" is read when the star wheels 95 are pulsed, which will occur during CR2 time, as soon as keeper contact 65a closes and verifies that the card has advanced. Then the drum will escape to column "5."

Hence, during each read operation the columns will always be read in pairs, and one complete CR cycle will be needed to read each column. After the drum escapes to an odd column, the information obtained from these two card columns will be transmitted from the buffer relays R114 to R149 to the utilization device UD when buffers ready relays R13, R14, R15 are picked. If device UD wants to read another two columns it will transmit a pulse to again pick coil P of card advance relay R3 in the same manner as above described. Thus, the card will be read two columns at a time as long as the device UD renews the pulse to R3 after each escapement to an odd column.

If after all eighty columns of a card have been read, a pulse is given by the device UD to card advance relay R3, an eject will be initiated to bring the following card to the read station 24. With R3 picked, this eject will be initiated when cam DC1 makes a column "81" time and completes a circuit to energize eject relay R4, eject hold relay R5, and keeper magnet 65. This circuit extends from line B through R3b N/O (FIG. 7A–LL), DC1, and thence to ground via three branch legs; one leading through keeper magnet 65; another through R18c N/C, R3c N/O and coil P2 of R4; and the third through pick coil P of R5. The escape even and escape odd magnets 64, 63 will also be energized via circuits previously traced, including R4a N/O (FIG. 7B–LL), 63a, R4d N/O, R8d N/C, and R4b N/O. The drum 22 will then escape in the same manner as already described as occurring during an eject cycle until column "1" of the card is brought into registry with the star wheels 95.

It is to be noted, however, that if a decision is made (by pulsing R3) to read columns "3" and "4" of a card, it is not necessary that the entire eighty columns of that card be read. After any number of column pairs have been read, the utilization device, instead of again pulsing card advance relay R3 to initiate reading of another two columns, may transmit a pulse via UD contact m and PB4 (FIG. 7B–UL) to pick eject relay R4. This will cause drum 22 to rotate and initiate an eject cycle as already described, it being noted that stacking check card lever CL5 will be closed so long as there is no failure to stack cards as they arrive at the stacking station at 25.

*Rereading a Card*

At any stage during the reading of a card, the utilization device UD may give an answer back signal commanding that the star whels 95 reread that card or a preceding card which is still on the drum. This is done by transmitting a pulse via UD contact n and PB5 (FIG. 7B–UR) to pick reread relay R6.

During a reread operation, various problems are encountered. To obviate the necessity of having to recirculate all the cards in the deck to reread the desired card, all cards already on the drum must remain on the drum.

Also to preserve the original sequence of the cards, the reread operation must continue until the drum advances to a position from which the cards that have been recirculated around the drum can be stacked in proper sequence. Meanwhile, no cards should be fed onto the drum. Hence, during a reread operation, the secondary clutch 67, 69 must be disengaged to prevent new cards from being fed by the picker knife 13 into the chute 14, 15 and also prevent cards already in the chute from being advanced toward the drum by feed rolls 16 to 19.

When the secondary clutch 67, 69 is disengaged, drum 22 will continue to rotate through the driving action of slip clutch 50, 53, 51 to the extent permitted by the conditioning of the escape odd and escape magnets 63, 64. Since the torque which was orignally utilized to drive the feed rolls 19 to 16 and picker knife cams 84, 85 would now undesirably be applied to the drum 22 and tend to increase wear of the escapement armatures and ratchets, load simulator relay R20 is energized to apply a small voltage to the magnetic brake 93. Brake 93 will then impose a drag on the brake pinion 94 and hence on the drum 22 to simulate the torque which normally is required to drive rolls 19 to 16 and cams 84, 85 to prevent such increased wear.

Four card cycles are necessary to transport a card from the read station 24, around the drum 22, and back to the read station during a reread operation. These cycles will now be described in detail.

Figure 8A:
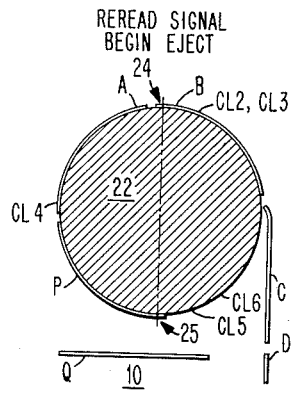
Figure 8B:
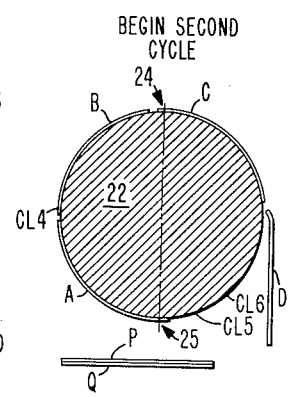
Figure 8C:
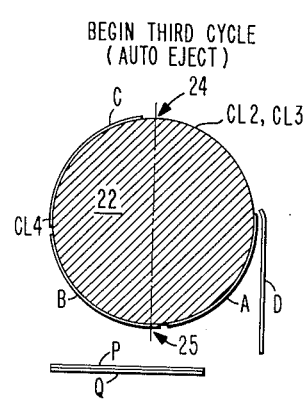

Referring now to FIG. 8A, assume initially that a card C has just been clamped to drum 22 at the entry station (exit end of chute 14, 15); that a card B is at the read station 24; that a card A is at the reread checking station at CL4; that the clamping means 23 has just been unclamped to cause a card P to be stacked in the hopper-stacker 10; and that a card Q has already been stacked (after column "81" time during the previous cycle).

Assume now that at any time after columns "1" and "2" or any other pair of subsequent columns of card B have been read, the device UD sends a pulse through PB5 (FIG. 7B–UR) to initiate the first reread cycle, which will be an eject cycle. This pulse will be transmitted via UD contact n, PB5, R112d N/C, pick coil P of reread relay R6, switch 200 and stacking check card lever CL5 to ground (because there is now no card at CL5) and thus pick R6. R6 is held through a circuit from line B through reread check card lever CL4 (now closed by card A), R6d N/O (FIG. 7D–UR) and hold coil H of R6 to ground.

When cam DC7 makes at column "56" position during this first reread eject cycle, reread hold relays R112 and R113 will be picked through a circuit from line B through CL4 (FIG. 7D–UR), R6d N/O, DC7, and thence in parallel to ground through pick coils P of R112 and R113.

Since R112 is picked, when DC5 makes at column "75" position of the drum 22 reread solenoid 25 will be energized through a circuit from line B through DC5 (FIG. 7C–middle) R112b N/O R6a N/O and the coil of solenoid 25 to ground. With solenoid 25 energized, pin 124 (FIG. 5) will be retracted and prevent toggle 110 from being flipped, thereby causing card A to remain clamped to the drum. The secondary clutch magnet 91 and the picker knife clutch magnet 92 and stacking brake coil 125, which are normally energized when DC5 makes, will not be energized at this time because the R112b N/C point (FIG. 7C–LL) will now be open. Hence, no cards will be fed into or moved along the chute, and the stacking brake 125a will not operate to pull card A from under the clamping jaw 109.

Also, since R112 is now energized, R112c N/C point (FIG. 7C–LR) will be open. This will prevent energization of auxiliary feed solenoid 113 when DC8 makes at column "90" position of the drum 22 and hence prevent card D (FIG. 8B) from being fed onto the drum during the second cycle of the reread operation. The drum 22 will advance without interruption until column "1" of card C arrives at the read station 24. Columns "1" and "2" of card C will then be read when cam CR2 makes and initiates a reading of columns "1" and "2." Thereafter the drum will advance to and then stop at column "3" position.

*Second cycle.*—While the drum is at column "3" position, an eject command will be given from the utilization device UD via UD contact *m* and PB4 because card C which is now at the read station is obviously not the card which is to be reread. This pulse given through PB4 will pick eject relay R4 and initiate the second cycle of the reread operation, which will be an eject cycle (see FIG. 8B). When this eject command is given, R6, R112 and R113 will still be energized because card B is now at the reread checking station and closes CL4. Approximately halfway through this second cycle, card A will reach and transfer the contact of blank station card lever CL6. Reread hold relays R112, R113 will then be held through a circuit from line B through CL6 N/O (FIG. 7C–LR), R112a N/O, a diode 245, and thence in parallel to ground via hold coils H of R112 and R113. Hence, reread solenoid 25 will again be energized during this cycle to prevent stacking of card B; and the picker knife 13 and feed rolls 19 to 16 and auxiliary feed roll 20 will not move.

Meanwhile, during the second cycle, after column "1" of card C arrives at the read station 24 and cam CR2 makes, R101 (try escape) and R108 (trying to read) will be picked in the usual manner and load simulator relay R20 will also be picked because R113 will now be energized. This will be effected by closure of a circuit from line B through R4c N/C (FIG. 7A–LL), keeper contact 65a, CR2, R106b N/C, R14b N/C, R7c N/O, and thence in parallel to ground through coil P of R108, through a diode 250 and coil P of R101, and through said diode and R113b N/O and coil P of R20. Thus, R101, R108 and R20 will be energized for the same purposes as heretofore described. However, R20 will be held through a circuit from line B through R18a N/C (FIG. 7C–UL), R20a N/O, and hold coil H of R20 to ground. When R20 is picked, a circuit will be completed from line B through R20b N/O (FIG. 7C–UR), a rheostat 248, a diode 249 and magnetic brake 93 to ground to energize the brake to simulate the torque which would have been applied to drive the picker knife cams and feed rolls 19 to 16.

*Third cycle.*—During this cycle (see FIG. 8C), card A will be carried past the entry station near the exit end of chute 14, 15. Card B will be carried past the stacking station at 25 because solenoid 25 will be energized. Card C will be carried past the reread checking station at CL4. A blank quadrant of the drum will move past the read station. This cycle will end when the first two columns of the now recirculated card A are read at the read station (see FIG. 8D).

The only significant differences during this eject cycle are that since no card is now at the read station 24, the apparatus will automatically give itself an eject command when cam CR5 makes after the star wheels 95 have gone through the motions of reading columns "1" and "2" at the end of the second cycle. This automatic blank card eject is effected by picking R104 via circuitry, including wire 315, R8b N/O (FIG. 7B–LR), R2c N/C, CR5, R151c N/C, CL2 N/C, and R10b N/C, in substantially the same manner as described in connection with an automatic eject at the end of the first cycle of the load drum operation.

Also, R20 will drop out when DC4 makes at column "83" position and picks brake time relay R18 to energize brake 93 to decelerate the drum 22. Thus when R20 drops out, the load simulation braking wil be released but the normal braking action of magnetic brake 93 will be effective.

Toward the end of this cycle, a blank position of the drum will register with reread check card lever CL4. This will open the hold circuit for R6 (see FIG. 7D–UR). However, R112 and R113 (reread hold) will still be held because card B will be at the blank station and keep card lever CL6 N/O made (see FIG. 7C–LR). It will be recalled that as long as R112 and R113 are held, no cards will be fed into or along the chute. When R6 drops, it will deenergize the reread solenoid 25 so that card A will be stacked a full cycle later (see FIG. 8F).

The drum will escape until column "1" of card A arrives at the read station 24. Then columns "1" and "2" will be read and the drum will escape to column "3," now completing the third cycle. The drum will now wait at column "3" (see FIG. 8D) until a command is received from the utilization device UD. This command may be to read card A which is now at the read station 24, in which case card advance relay R3 will be pulsed via PB3 (FIG. 7B–UR); or it may be to eject card A so that card B can be reread, in which case eject relay R4 will be pulsed via PB4, as already described in detail.

It is important to note here that, in the embodiment illustrated, wherein the stacking station is two card cycles from the read station, the decision to reread a card may be deferred until after a succeeding card has been read; in other words, the apparatus here can decide at any time during the reading of card B that it wishes to reread the preceding card A or that particular card B. Also, three cards A, B, C can be reread; or more properly, two cards A, B can be reread and the reading of the third card C (which is already on the drum) deferred until after the rereading of cards A and/or B.

Figure 8D:
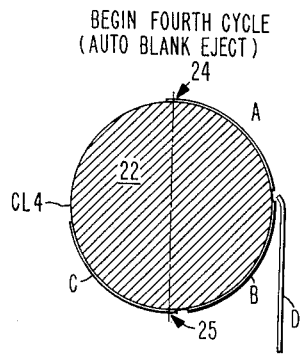
Figure 8E:
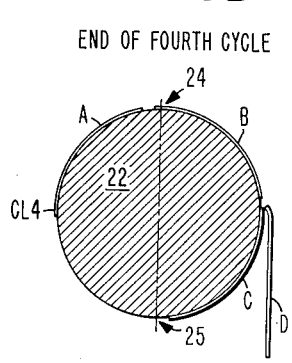
Figure 8F:
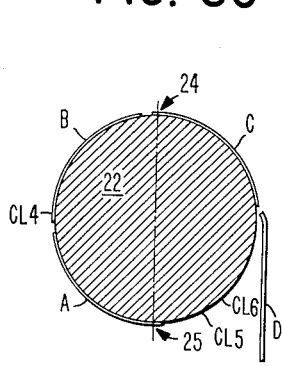

*Fourth cycle.*—During this cycle, cards A, B and C will advance ninety degrees from the positions in which they are shown in FIG. 8D to the positions shown in FIG. 8E. This will be either in response to an external eject or card advance command. In either event, at the end of this cycle, columns "1" and "2" of card B will be reread, then the drum will escape to column "3."

If a pulse is given by the utilization device UD to card advance relay R3, card B will be reread as originally intended. In any event, when the drum moves far enough to carry card C past blank station card lever CL6, it will break the hold circuit for reread hold relays R112 and R113. This will permit the secondary clutch magnet 91 and picker knife clutch magnet 92 to become energized when DC5 makes at column "75" and also permit auxiliary feed solenoid 113 to become energized when DC8 makes at column "90." This will reactivate the picker knife 13 and feed rolls 19 to 16 and accelerating rolls 20, 21 so that after card C is read, card D will now be advanced from the chute onto the drum (see FIG. 8F) and card A will be stacked.

*Unload Drum*

To clear all cards from the chute 14, 15 and also from drum 22 there must be a card either at the read station 24 or at the reread checking station at CL4. This will permit unloading of the drum during a reread operation while a blank quadrant may be at one or the other (but blank quadrants will not be concurrently at both) of these stations. Assuming, then, that a card is at the read station 24 or at the reread checking station at CL4, the unloading or clearing operation is initiated by depressing a push-button type unload drum switch SW2. This will complete a circuit from line B through read station card lever CL3 (or reread check card lever CL4 and a diode 260 (see FIG. 7D–UL)), switch SW2, and thence in parallel via hold coil H of unload drum relay R151 and coil P2 of parity bypass relay R1 to a common point and thence via wire 302, hopper door switch 200 (FIG. 7B–UR), and CL5 to ground. It is to be noted that CL5 will be in its N/C position because during a drum unloading operation no card should pass the stacking station at 25.

Once R151 is energized, it will be held via its R151a N/O point which shunts unload drum switch SW2; and hence the operator may now remove his finger from SW2.

When the buffer ready relays R13, R14, R15 are picked and thus have signaled that the card at the read station has been read, eject relay R4 will be picked via a circuit completed through SW2 (FIG. 7D–UL) and/or R151a N/O, R14d N/O, a wire 318, a diode 248, R5d N/C, pick coil P of R4, hopper door switch 200 and CL5 to ground. With R4 picked an eject cycle will be initiated in generally the same manner as described in connection with loading of the drum, in that R1d N/O (FIG. 7B–UL) will be made and eliminate the parity requirement. However, there are several differences. When CR5 makes, R151b N/C (FIG. 7C–LL) will now be opened and prevent energization of the picker knife clutch magnet 92; hence, no new cards will be fed into chute 14, 15. However when CR5 makes, the secondary clutch magnet 91 (FIG. 7C–LL) will be energized to cause the cards already in the chute to be advanced onto the drum 22. Also, when CR5 makes, a circuit will be completed through CR5 (FIG. 7B–LR), R151c N/O (bypassing CL2 at the read station) and the pick coils P of R13, R14, R15 to ground to keep the buffer ready relays R13–R15 energized internally.

Thus the apparatus will give itself repeated eject commands by successively picking eject relay R4 at CR5 time of each cycle until the last card passes reread check station CL4 and opens CL4 to drop R151. When this occurs, all cards will have been cleared from the chute and drum.

*Summary*

It will thus be seen that with the programming apparatus herein disclosed the decision to rerun a card past a single read station may be delayed until after a subsequent card is read. In the embodiment illustrated, the decision to reread a preceding card A has to be made before column "81" of the succeeding card B because the read station 24 and reread solenoid 25 are two card cycles apart; however, it will be apparent that by enlarging the diameter of drum 22 or shortening the cards or feeding and reading the cards in "parallel" (i.e., row-by-row instead of "serially" or column-by-column) a greater number of cards could be accommodated between the read station and the pin 124 controlled by reread solenoid 25. This would enable a decision to read one card to be deferred, for example, until after a third, fifth or sixth succeeding card is read.

It will also be noted that during a reread operation, the feeding of new cards onto the drum will be suspended until after the last card fed onto the drum has been carried past the entry or loading point, thereby to preserve the original sequence of the deck.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an apparatus controlled by a series of record forms, the combination of read means for reading information from the forms, endless means for conveying successive forms from an entry point past said read means to a departure point, reread control means normally conditioned to cause release of each form from the endless means at the departure point and abnormally conditioned to prevent such release to cause forms to be retained on the endless means and recirculated past said read means, feed means for feeding forms successively onto the endless means at the entry point, means operable if and when certain information is read by the read means from one form to command rereading of a preceding form which has not reached the departure point, and means responsive to such command to effect such abnormal conditioning of said reread control means and suspend operation of said feed means.

2. In combination, read means for reading information from a series of record forms, endless means for conveying successive forms from an entry point past said read means to a departure point, reread control means normally conditioned to cause release of each form from the endless means at the departure point and abnormally conditioned to prevent such release to cause forms to be retained on the endless means and recirculated past said read means to cause all such retained forms to be reread thereby, feed means for feeding forms successively onto the endless means at the entry point, utilization means including means operable in accordance with information read by said read means from each form to give a selectable one of a plurality of commands, one of said commands being to reread a preceding form which has not reached the departure point, and means responsive to such one command to abnormally condition said reread control means and suspend operation of said feed means until after the last form fed onto the endless means prior to such one command has been carried past said entry point, thereby to preserve the original order of the forms.

3. In an apparatus controlled by a series of record forms, the combination of read means for reading data and control information from the forms, endless means for conveying the forms successively past said read means, means for normally feeding successive forms onto said endless means at an entry point, a plurality of means associated with said endless means for securing respective forms thereto as they are carried from the entry point past said read means to a departure point, reread control means normally positioned to cause opening of each securing means as it arrives at the departure point so the form held thereby will be diverted off the endless means, said reread control means being abnormally positionable so as to be ineffective to effect such opening and thus cause forms on said endless means to be recirculated past the read means for rereading, means operable in accordance with certain information read by said read means from one form to give an answer back signal calling for rereading of a preceding form which has not reached the departure point, and means responsive to such signal to suspend operation of said feed means and effect said abnormal positioning of said reread control means.

4. In an apparatus controlled by a series of record forms, the combination of means for reading information from successive forms one at a time, endless means for conveying successive forms from an entry point past said read means to a departure point, reread control means normally conditioned to cause release of each form from the endless means at the departure point and abnormally conditioned to prevent such release to cause forms to be retained on the endless means and recirculated past said read means, means for feeding forms successively onto the endless means at the entry point, utilization means including means selectively operable according to information read by said read means from at least a portion of each form to give one signal to cause more of such form to be read, or another signal to cause such form to be advanced without further reading to a position for reading the succeeding form, or a third signal to cause recirculation and rereading of forms then on the endless means, and means operable only in response to said third signal to render said reread control means ineffective and also suspend operation of said feed means.

5. In a record form reading apparatus, the combination of read means for reading a form, means for conveying forms successively from an entry station past the read means to an exit station, escapement control means normally constraining the conveying means to advance the forms intermittently line-by-line past the read means, means for sensing whether a form is in position to be read by said read means, and means controlled by said sensing means for rendering the escapement control means inoperative when no form is sensed by said sensing means to thereby cause said conveying means to operate uninterruptedly until the first line of the next form is at the read means.

6. In a record form reading apparatus, the combination of read means for reading a form, a drum for conveying forms successively from an entry station past the read means to an exit station, escapement control means normally constraining the drum to advance the forms intermittently line-by-line in a series of separate two-line increments past the read means and wait for an answer back signal at the end of each increment, a pair of buffer means each for storing information read from one of the lines of successive two-line increments, means operative after the information has been read from the lines of each increment to transmit the information from both of such lines concurrently, utilization means operable in accordance with the information transmitted thereto by said transmitting means to give an answer back advance signal or an answer back eject signal, means responsive to the advance signal to cause the drum to advance line-by-line and cause the lines of the next increment to be read successively, and means responsive to the eject signal to deactivate said escapement control means to cause said drum to advance uninterruptedly until the first line of the succeeding card is at the read means.

7. In a record form reading apparatus, the combination of read means at a read station for reading a form, a drum for conveying forms successively from an entry station past the read station and thence normally only as far as an exit station, means normally feeding forms successively onto the drum as a predetermined part of the drum passes the entry station, means normally releasing each form from the drum at the exit station, utilization means operable in accordance with the information read from a portion of each form to give an answer back signal that controls subsequent rotation of the drum and operation of the feeding means and of the form-releasing means, means responsive to a reread answer back signal to stop said feeding means and render said form-releasing means inoperative until the drum has made one complete revolution and also cause the drum to advance the last-fed form from the entry station to the read means, means responsive to an eject answer back signal given after a portion of said last-fed form is read by the read means to rotate the drum until a blank space arrives at the read means, means operative when the blank space is sensed at the read station to automatically initiate another eject operation during which the foremost form retained on the drum is advanced to the read station, and means operative according to whether an eject answer back signal or an advance answer back signal is given by the utilization means after the initial portion of said foremost form is read to advance the next form to the read station or read an additional portion of said foremost form, respectively.

8. The combination according to claim 7, including clutch means for driving said feeding means from said drum, said clutch means being disengaged during a reread operation to stop the feeding means, and load simulating means for applying a load to the drum simulating the torque of said feeding means while the clutch means is disengaged.

9. The combination according to claim 1, including at least one clamping member carried by the endless means to clamp a respective form thereto, toggle means for actuating each member, and an element normally projecting laterally toward the endless means and into the path of the toggle means for flipping each toggle means to unclamping position as it reaches the departure point, said reread control means when abnormally conditioned being effective to retract the element from the path of the toggle means to prevent unclamping of the associated member.

10. In an apparatus for reading forms, the combination of a rotating drum, and least one clamping member carried by the drum to clamp a respective form to the drum periphery at an entry station and carry such form past a read station to a departure station, toggle means for actuating each member, elements projecting laterally toward the drum near the entry station and departure station for flipping each toggle means respectively to clamping position after the member passes the entry station and then to unclamping position as it reaches the departure station, utilization means responsive to information sensed at the read station, and reread control means responsive to a reread signal from the utilization means for retracting the element at the departure station out of the path of the toggle means to prevent its being flipped to unclamping position so the form will be recirculated past the entry and read stations for rereading.

11. In an apparatus controlled by a series of record forms, the combination of means for reading information from the forms, means for conveying forms in a closed loop path for continuous recirculation in sequence, said conveying means including an endless means for normally carrying forms between two points spaced along said path, reread control means normally conditioned to cause release of each form from the enless means at one of said points and abnormally conditioned to prevent such release to cause forms to be retained on the endless means and recirculated past said read means and said points in a smaller closed loop path than the first-mentioned path, means operable if and when certain information is read by the read means from one form to command rereading of a preceding form which has not reached said one point, and means responsive to such command to effect such abnormal conditioning of said reread control means and condition said conveying means to suspend the feeding of additional forms onto said endless means.

References Cited in the file of this patent

UNITED STATES PATENTS

| | | |
|---|---|---|
| 458,945 | Crane et al. | Sept. 1, 1891 |
| 2,076,713 | Ford | Apr. 13, 1937 |
| 2,831,634 | Luhn | Apr. 22, 1958 |
| 2,842,362 | Hayes et al. | June 8, 1958 |
| 2,853,237 | Zaffarano et al. | Sept. 23, 1958 |
| 2,880,990 | Oldenboom | Apr. 7, 1959 |
| 2,965,291 | Hayes et al. | Dec. 20, 1960 |